United States Patent
Fukushima et al.

(10) Patent No.: US 12,288,842 B2
(45) Date of Patent: Apr. 29, 2025

(54) SULFIDE SOLID ELECTROLYTE AND ALL-SOLID-STATE BATTERY

(71) Applicant: GS Yuasa International Ltd., Kyoto (JP)

(72) Inventors: Akihiro Fukushima, Kyoto (JP); Ryo Sakuma, Kyoto (JP); Tadashi Kakeya, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 705 days.

(21) Appl. No.: 17/270,728

(22) PCT Filed: Aug. 30, 2019

(86) PCT No.: PCT/JP2019/034138
§ 371 (c)(1),
(2) Date: Feb. 23, 2021

(87) PCT Pub. No.: WO2020/045633
PCT Pub. Date: Mar. 5, 2020

(65) Prior Publication Data
US 2021/0218056 A1 Jul. 15, 2021

(30) Foreign Application Priority Data

Aug. 30, 2018 (JP) ................................. 2018-161831
Dec. 12, 2018 (JP) ................................. 2018-232775
(Continued)

(51) Int. Cl.
*H01M 10/00* (2006.01)
*C01B 25/14* (2006.01)
(Continued)

(52) U.S. Cl.
CPC ......... *H01M 10/0562* (2013.01); *C01B 25/14* (2013.01); *H01M 10/0525* (2013.01); *C01P 2002/74* (2013.01); *H01M 2300/0068* (2013.01)

(58) Field of Classification Search
CPC ........... H01M 10/052; H01M 10/0562; H01M 4/5815; H01M 4/366; H01M 4/043; H01M 4/136
See application file for complete search history.

(56) References Cited

U.S. PATENT DOCUMENTS

| | | |
|---|---|---|
| 6,365,300 B1 | 4/2002 | Ota et al. |
| 10,396,395 B2 | 8/2019 | Kanno et al. |

(Continued)

FOREIGN PATENT DOCUMENTS

| | | |
|---|---|---|
| JP | 56-116276 A | 9/1981 |
| JP | 2000-340257 A | 12/2000 |

(Continued)

OTHER PUBLICATIONS

Francisco et al, Solid Electrolyte Material and Solid-State Battery Made Therewith, Oct. 2018, See the Abstract. (Year: 2018).*
Becker et al., Solid Electrolyte Material and Solid-State Battery Made Therewith, Oct. 2018, See the Abstract. (Year: 2018).*
Mizuno et al., "High lithium ion conducting glass-ceramics in the system Li2S—P2S5", ScienceDirect, Elsevier, 2006, Solid State Ionics 177, pp. 2721-2725; Cited in Specification.

(Continued)

*Primary Examiner* — Anca Eoff
*Assistant Examiner* — Monique M Wills
(74) *Attorney, Agent, or Firm* — RANKIN, HILL & CLARK LLP

(57) ABSTRACT

An aspect of the present invention is a sulfide solid electrolyte that contains at least one element M selected from the group consisting of Al, Si, B, Mg, Zr, Ti, Hf, Ca, Sr, Sc, Ce, Ta, Nb, W, Mo, and V, and N and has a crystalline structure. Another aspect of the present invention is a sulfide solid electrolyte that contains Al and N and that has a crystalline structure.

21 Claims, 9 Drawing Sheets

(30) Foreign Application Priority Data

| | | | |
|---|---|---|---|
| Mar. 13, 2019 | (JP) | ................................ | 2019-045347 |
| Jun. 3, 2019 | (JP) | ................................ | 2019-103611 |

(51) Int. Cl.
H01M 10/0525 (2010.01)
H01M 10/0562 (2010.01)

(56) References Cited

U.S. PATENT DOCUMENTS

| | | | |
|---|---|---|---|
| 2007/0042272 A1 | 2/2007 | Ugaji et al. | |
| 2014/0072875 A1 | 3/2014 | Uchiyama | |
| 2014/0141341 A1 | 5/2014 | Ohtomo et al. | |
| 2014/0370398 A1* | 12/2014 | Lee | H01M 4/5815 29/623.5 |
| 2015/0044575 A1 | 2/2015 | Kawaji et al. | |
| 2015/0214572 A1 | 7/2015 | Kato et al. | |
| 2015/0357673 A1* | 12/2015 | Kanno | H01B 1/10 429/304 |
| 2015/0357675 A1 | 12/2015 | Ohtomo et al. | |
| 2016/0133989 A1 | 5/2016 | Suzuki et al. | |
| 2018/0205116 A1* | 7/2018 | Kanno | H01M 10/0562 |
| 2018/0233775 A1 | 8/2018 | Suzuki et al. | |
| 2018/0269527 A1 | 9/2018 | Minami | |
| 2018/0287204 A1 | 10/2018 | Kanno et al. | |
| 2018/0309165 A1* | 10/2018 | Yersak | H01M 10/058 |
| 2021/0194050 A1 | 6/2021 | Fukushima et al. | |

FOREIGN PATENT DOCUMENTS

| | | | |
|---|---|---|---|
| JP | 2005-38844 A | 2/2005 | |
| JP | 2012-243443 A | 12/2012 | |
| JP | 2013-16423 A | 1/2013 | |
| JP | 2014-60174 A | 4/2014 | |
| JP | 2015-11898 A | 1/2015 | |
| JP | 2015-35334 A | 2/2015 | |
| JP | 5780322 B2 | 9/2015 | |
| JP | 5971756 B2 | 8/2016 | |
| JP | 2017-168449 | 9/2017 | |
| JP | 2018-41671 A | 3/2018 | |
| JP | 2018-156735 A | 10/2018 | |
| JP | 6986468 B2 | 12/2021 | |
| JP | 2022030244 A | 2/2022 | |
| WO | WO-2018183365 A1 * | 10/2018 | ............. C01B 17/22 |

OTHER PUBLICATIONS

Huang et al., "Li3PO4-doped Li7P3S11 glass-ceramic electrolytes with enhanced lithium ion conductivities and application in all-solid-state batteries", Elsevier, 2015, Journal of Power Sources 284, pp. 206-211.

Fukushima et al., "Mechanochemical synthesis of high lithium ion conducting solid electrolytes in a Li2S—P2S5—Li3N system", Elsevier, 2017, Solid State Ionics 304, pp. 85-89; Cited in Specification.

Zhu et al., "Origin of Outstanding Stability in the Lithium Solid Electrolyte Materials: Insights from Thermodynamic Analyses Based on First-Principles Calculations", ACS Publications, 2015, ACS Appl. Mater. Interfaces 7, pp. 23685-23693; Cited in Specification.

Ohtomo et al., "All-solid-state lithium secondary batteries using the 75Li2S • 25P2S5 glass and the 70Li2S • 30P2S5 glass-ceramic as solid electrolytes", Elsevier, 2013, Journal of Power Sources 233, pp. 231-235.

Wenzel et al., "Supporting Information for: Direct Observation of the Interfacial In-stability of the Fast Ionic Conductor Li10GeP2S12 at the Lithium Metal Anode", Chem. Mater., 2016, total 3 pages.

Zhu et al., "Strategies Based on Nitride Materials Chemistry to Stabilize Li Metal Anode", Advanced Science News, 2017, Adv. Sci. 4, 1600517, total 11 pages.

Sun et al., "Oxygen substitution effects in Li10GeP2S12 solid electrolyte", Elsevier, 2016, Journal of Power Sources 324, pp. 798-803.

International Search Report (ISR) dated Nov. 5, 2019 filed in PCT/JP2019/034138.

Iio K et al: "Mechanochemical Synthesis of High Lithium Ion Conducting Materials in the System Li3N—SiS2" Chemistry of Materials, American Chemical Society, US, vol. 14, No. 6, Jun. 1, 2002 (Jun. 1, 2002), pp. 2444-2449.

Sakamoto Ryosuke et al: "Preparation of Fast Lithium Ion Conducting Glasses in the System Li2S—SiS2—Li3N", Journal of Physical Chemistry Part B, vol. 103, No. 20, Mar. 2, 1999 (Mar. 2, 1999), pp. 4029-4031.

Hori Satoshi et al: "Phase Diagram of the Li4GeS4—Li3PS4 Quasi-Binary System Containing the Superionic Conductor Li10GeP2S12", Journal of the American Ceramic Society, vol. 98, No. 10, Jul. 8, 2015 (Jul. 8, 2015), pp. 3352-3360.

Yamane H et al: "Preparation and Electrochemical Properties of Double-Metal Nitrides Containing Lithium", Journal of Power Sources, Elsevier SA, CH, vol. 20, No. 3-4, Jul. 1, 1987 (Jul. 1, 1987), pp. 311-315.

* cited by examiner

SULFIDE SOLID ELECTROLYTE AND ALL-SOLID-STATE BATTERY

TECHNICAL FIELD

The present invention relates to a sulfide solid electrolyte and an all-solid-state battery.

BACKGROUND ART

Nonaqueous electrolyte secondary batteries typified by lithium-ion nonaqueous electrolyte secondary batteries are, because of the high energy density, heavily used in electronic devices such as personal computers and communication terminals, and automobiles. The nonaqueous electrolyte secondary battery typically including an electrode assembly with a pair of electrically isolated electrodes and a nonaqueous electrolyte interposed between the electrodes is configured for charge-discharge through ion transfer between the both electrodes.

In recent years, for the purpose of improving the safety of nonaqueous electrolyte secondary batteries, an all-solid-state battery is proposed in which a sulfide solid electrolyte or the like is used as a nonaqueous electrolyte instead of a liquid electrolyte such as an organic solvent (see Patent Document 1).

A sulfide solid electrolyte that contains Li, P, S, and N and has a composition represented by the general formula $XLi_2S-25P_2S_5$—$YLi_3N$ ($10 \leq Y \leq 15$, $67.5 \leq X+Y \leq 85$), which is a crystalline material, is disclosed as an example of a sulfide solid electrolyte, (see Patent Document 2)

As sulfide solid electrolytes, $70Li_2S \cdot 30P_2S_5$ glass ceramics and $60Li_2S \cdot 25P_2S_5 \cdot 10Li_3N$ glass ceramics are reported to show high ion conductivities of $10^{-3}$ S/cm or more. (Non-Patent Document 1)

The first principle calculation has clearly demonstrated that such sulfide solid electrolytes essentially have low oxidation resistance and reduction resistance. (Non-Patent Document 2)

PRIOR ART DOCUMENTS

Patent Documents

Patent Document 1: JP-A-2000-340257
Patent Document 2: JP-A-2018-041671
Non-Patent Document 1: Solid State Ionics, 177, 2721 (2006), Solid State Ionics, 304, 85 (2016)
Non-Patent Document 2: ACS Appl. Mater. Interfaces, 7, 23685 (2015)

SUMMARY OF THE INVENTION

Problems to be Solved by the Invention

The present invention has been made based on the foregoing circumstances, and an object of the present invention is to provide a sulfide solid electrolyte with reduction resistance unproved, and an all-solid-state battery including the sulfide solid electrolyte.

Means for Solving the Problems

An aspect of the present invention made to solve the above problems is a sulfide solid electrolyte that contains at least one element M selected from the group consisting of Al, Si, B, Mg, Zr, Ti, Hf, Ca, Sr, Sc, Ce, Ta, Nb, W, Mo, and V, and N, and has a crystalline structure.

Another aspect of the present invention is a sulfide solid electrolyte that contains Al and N and that has a crystalline structure.

Advantages of the Invention

The sulfide solid electrolyte according to an aspect or another aspect of the present invention makes it possible to provide a sulfide solid electrolyte with reduction resistance improved.

MODE FOR CARRYING OUT THE INVENTION

Figure 1:
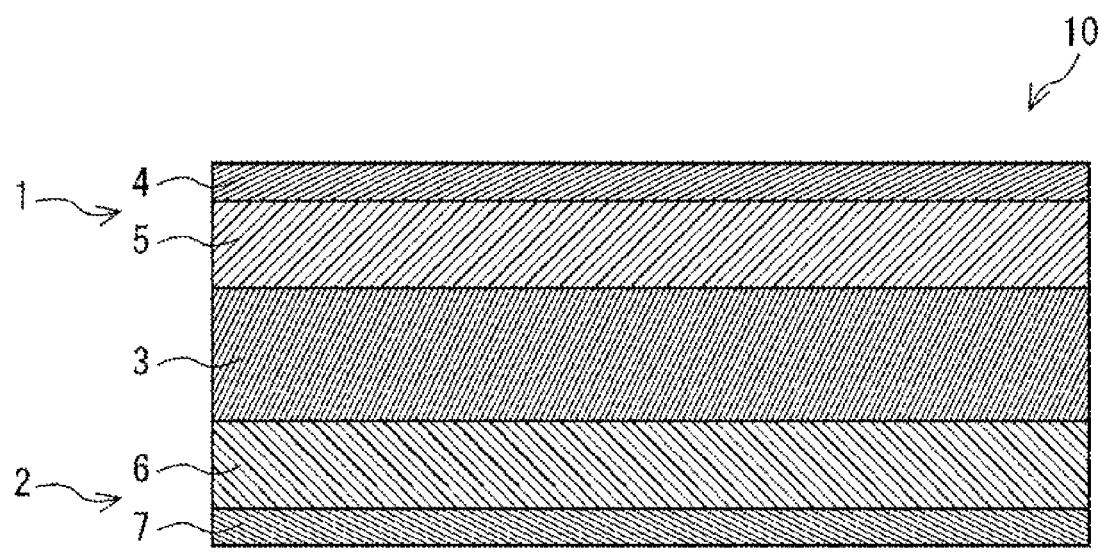
FIG. 1 is a schematic cross-sectional view illustrating an all-solid-state battery according to an embodiment of the present invention.

The sulfide solid electrolyte according to an aspect of the present invention is a sulfide solid electrolyte that contains at least one element M selected from the group consisting of Al, Si, B, Mg, Zr, Ti, Hf, Ca, Sr, Sc, Ce, Ta, Nb, W, Mo, and V, and N and has a crystalline structure.

The present inventors have focused attention on the fact that a nitride containing any of Al, Si, B, Mg, Zr, Ti, Hf, Ca, Sr, Sc, Ce, Ta, Nb, W, Mo, and V (hereinafter, also referred to as an element M), which are difficult, to apply as a solid electrolyte because of the low ion conductivity, shows high reduction resistance. Then, the inventors have considered that the sulfide solid electrolyte containing therein the nitrogen element (N) and the element M allows the reduction resistance of the sulfide solid electrolyte to be improved, and achieved the present invention.

The sulfide solid electrolyte contains at least one element M selected from the group consisting of Al, Si, B, Mg, Zr, Ti, Hf, Ca, Sr, Sc, Ce, Ta, Nb, W, Mo, and V, and N and has a crystalline structure, thereby making it possible to provide a sulfide solid electrolyte with reduction resistance improved. It is to be noted that the element M may be Al in the sulfide solid electrolyte. The reason therefor is not clear, but the following reason is presumed. When the sulfide solid electrolyte containing the element M and N is exposed to a reducing atmosphere, a film with high reduction resistance, containing a nitride of the element M, a lithium nitride of the element M, or the like, is presumed to be formed on the surface or interface of the sulfide solid electrolyte. For this reason, the reduction resistance of the sulfide solid electrolyte is presumed to be improved.

The all-solid-state battery including the sulfide solid electrolyte can be provided as an all-solid-state battery with a first coulombic efficiency improved. The reason therefor is not clear, but the following reason is presumed. The sulfide solid electrolyte has high reduction resistance, although a common sulfide solid electrolyte is known to be likely to be reductively decomposed, and an all-solid-state battery including such a sulfide solid electrolyte is thus known to show a large quantity of electricity for reductive decomposition. For this reason, the first coulombic efficiency of the all-solid-state battery including the sulfide solid electrolyte can be improved.

Furthermore, the sulfide solid electrolyte contains N, thereby causing S to be replaced with N that is smaller in ionic radius, and reducing the crystal lattice volume. Thus, the increased space for lithium ion movements allows the ion conductivity to be improved. As a result, the first coulombic efficiency of the all-solid-state battery can be improved while maintaining good ion conductivity.

The element M in the sulfide solid electrolyte may be any element as long as the nitride thereof has high reduction resistance. Specifically, the element may be at least one element selected from the group consisting of Al, Si, B, Mg, Zr, Ti, Hf, Ca, Sr, Sc, Ce, Ta, Nb, W, Mo, and V. These elements are elements that are clarified by the first principle calculation in that a lithium nitride containing the element M has high reduction resistance (see Non-Patent Document Adv. Sci., 4, 1600517 (2017))). Among these elements, Al, B, and Si are preferable because of the low costs, and of the manufacturing costs that can be reduced.

The crystalline structure preferably includes a crystalline structure that has a crystal phase of $Li_7P_3S_{11}$, $Li_4P_2S_6$, or ß-$Li_3PS_4$, or a first crystalline structure that has diffraction peaks at $2\theta=17.9°\pm0.5°$, $19.1°\pm0.5°$, $29.1°\pm0.5°$, and $29.8°\pm0.5°$ in X-ray diffraction measurement with a CuKα fine. This makes it possible to increase the ion conductivity at 25° C.

The first crystalline structure preferably includes a specific crystalline structure A that has diffraction peaks at $2\theta=17.9°\pm0.5°$, $19.1°\pm0.5°$, $29.1°\pm0.5°$, $29.8°\pm0.5°$, and $30.9°\pm0.5°$ in the X-ray diffraction measurement, or a specific crystalline structure B that has diffraction peaks at $2\theta=17.9°\pm0.5°$, $19.1°\pm0.5°$, $29.1°\pm0.5°$, and $29.8°\pm0.5°$ and has no diffraction peak at $30.9°\pm0.5°$ in the X-ray diffraction measurement. The configuration mentioned above makes it possible to further increase the ion conductivity at 25° C.

In the case where the sulfide solid electrolyte contains Li, P, S, N, and at least one element M selected from the group consisting of Al, Si, B, Mg, Zr, Ti, Hf, Ca, Sr, Sc, Ce, Ta, Nb, W, Mo, and V, from the viewpoint of reduction resistance, the content ratio of the Li to the P is preferably 1.64 or more and 4.00 or less in terms of mole ratio, and the content ratio of the N to the P is preferably 0.02 or more and 1.11 or less in terms of mole ratio. The content ratios of the Li and N in the sulfide solid electrolyte fall within the ranges mentioned above, thereby further improving the reduction resistance, and making it possible to further increase the first coulombic efficiency of the all-solid-state battery including the sulfide solid electrolyte. It is to be noted that the element M may be Al in the sulfide solid electrolyte.

In the sulfide solid electrolyte, the content ratio of the Li to the P is further preferably 2.77 or more and 3.38 or less in terms of mole ratio, and the content ratio of the N to the P is further preferably 0.28 or more and 0.65 or less in terms of mole ratio. The content ratios of the Li and N in the sulfide solid electrolyte fall within the ranges mentioned above, thereby allowing the reduction resistance, the atmospheric stability, and the ion conductivity at 25° C. to be improved at the same time.

The sulfide solid electrolyte preferably has a composition represented by the general formula $(100-z)(yLi_2S\cdot(1-y)P_2S_5)\cdot zLi_\alpha M_\beta N$ (where $0<z\leq40$, $0.50\leq y\leq0.75$, α and ß represent numerical values that provide stoichiometric ratios depending on the type of the element M). The sulfide solid electrolyte has a composition represented by the general formula mentioned above, thereby further improving the reduction resistance, and making it possible to further increase the first coulombic efficiency of the all-solid-state battery including the sulfide solid electrolyte.

The sulfide solid electrolyte may further contain Ge. Even with such a sulfide solid electrolyte, the effect of the present invention can be enjoyed.

In the case where the sulfide solid electrolyte contains Ge, the sulfide solid electrolyte preferably includes a structure that has a crystal phase of $Li_{10}GeP_2S_{12}$.

In addition, in the case where the sulfide solid electrolyte contains Li, P, S, N, and Ge, and the element M, and has a crystal phase of $Li_{10}GeP_2S_{12}$, the content ratio of the Li to the P is preferably 5.01 or more and 5.61 or less in terms of mole ratio, and the content ratio of the N to the P is preferably 0.0051 or more and 0.41 or less in terms of mole ratio. In addition, the content ratio of the Li to the P is further preferably 5.06 or more and 5.19 or less in terms of mole ratio, and the content ratio of the N to the P is further preferably 0.038 or more and 0.13 or less in terms of mole ratio.

In the case where the sulfide solid electrolyte contains Ge, the sulfide solid electrolyte preferably has a composition represented by the general formula $(100-z)Li_{10}GeP_2S_{12}\cdot zLi_\alpha M_\beta N$ (where $0<z\leq50$, α and ß represent numerical values that provide stoichiometric ratios depending on the type of the element M). Above all, in the general formula mentioned above, z particularly preferably satisfies $0<z\leq20$.

The ion conductivity of the sulfide solid electrolyte at 25° C. is preferably $1.0\times10^{-3}$ S/cm or more. The configuration mentioned above allows the high rate discharge performance of the all-solid-state battery including the sulfide solid electrolyte to be improved.

It is to be noted that the ion conductivity of the sulfide solid electrolyte at 25° C. is determined from measurement of the alternating-current impedance by the following method. Under an argon atmosphere with a dew point of −50° C. or lower, 120 mg of the sample powder is put into a powder molder of 10 mm in inner diameter, and then subjected to uniaxial pressing at a pressure of 50 MPa or less per sample area with the use of a hydraulic press. After pressure release, a SUS316L powder is put as a current collector onto the upper and lower surfaces of the sample, and then subjected to uniaxial pressing at a pressure of 360 MPa per pellet area for 5 minutes, thereby providing a pellet for ion conductivity measurement. This pellet for ion conductivity measurement is inserted into an HS cell from Hohsen Corp. to measure the alternating-current impedance. The measurement conditions are an applied voltage amplitude of 20 mV, a frequency range of 1 MHz to 100 mHz, and a measurement temperature of 25° C.

The all-solid-state battery according to another aspect of the present invention is an all-solid-state battery including a negative electrode layer, a solid electrolyte layer, and a positive electrode layer, where the negative electrode layer, the solid electrolyte layer, the positive electrode layer, or a combination thereof contains the sulfide solid electrolyte.

In the all-solid-state battery according to another aspect of the present invention, the first coulombic efficiency is excellent because the negative electrode layer, the solid electrolyte layer, the positive electrode layer, or a combination thereof contains the sulfide solid electrolyte. The sulfide solid electrolyte has excellent reduction resistance, and the negative electrode layer and/or the solid electrolyte layer thus preferably contain the sulfide solid electrolyte. The configuration mentioned above makes the effect of the present invention much greater.

Hereinafter, embodiments of the sulfide solid electrolyte and all-solid-state battery according to the present invention will be described in detail.

<Sulfide Solid Electrolyte>

The sulfide solid electrolyte contains at least one element M selected from the group consisting of Al, Si, B, Mg, Zr, Ti, Hf, Ca, Sr, Sc, Ce, Ta, Nb, W, Mo, and V, and N and has a crystalline structure. The sulfide solid electrolyte contains at least one element M selected from the group consisting of Al, Si, B, Mg, Zr, Ti, Hf, Ca, Sr, Sc, Ce, Ta, Nb, W, Mo, and V, and N and has a crystalline structure, thereby making it possible to improve the reduction resistance. The sulfide solid electrolyte can be used in any application that requires ion conductivity. Above all, the sulfide solid electrolyte is preferably used for a lithium all-solid-state battery. It is to be noted that the element M may be Al in the sulfide solid electrolyte.

The sulfide solid electrolyte has a crystalline structure. The phrase "to have a crystalline structure" herein means that a peak derived from the crystalline structure of the sulfide solid electrolyte is observed in the X-ray diffraction pattern in the X-ray diffraction measurement. The sulfide solid electrolyte may contain an amorphous portion. The sulfide solid electrolyte that has a crystalline structure can be obtained, for example, by crystallizing an amorphous sulfide solid electrolyte through a heat treatment or the like.

Examples of the crystalline structure of the sulfide solid electrolyte include a LGPS type, an argyrodite type, $Li_7P_3S_{11}$, and Thio-LISICON series. Among these structures, as the crystalline structure, the LGPS type, the argyrodite type, and $Li_7P_3S_{11}$ are preferable from the viewpoint of lithium ion conductivity, and among these three structures, $Li_7P_3S_{11}$ is more preferable because of the high stability to Li. From the viewpoint of stability to the atmosphere, it is preferable to include a crystalline structure that has a crystal phase of $Li_4P_2S_6$ or $ß-Li_3PS_4$, or a first crystalline structure that has diffraction peaks at $2θ=17.9°±0.5°$, $19.1°±0.5°$, $29.1°±0.5°$, and $29.8°±0.5°$ in X-ray diffraction measurement with a CuKα line, and among these structures, the first crystalline structure that has diffraction peaks at $2θ=17.9°±0.5°$, $19.1°±0.5°$, $29.1°±0.5°$, and $29.8°±0.5°$ in X-ray diffraction measurement with a CuKα line is more preferable because of the high lithium ion conductivity.

The first crystalline structure may include a specific crystalline structure A that has diffraction peaks at $2θ=17.9°±0.5°$, $19.1°±0.5°$, $29.1°±0.5°$, $29.8°±0.5°$, and $30.9°±0.5°$ in the X-ray diffraction measurement, or a specific crystalline structure B that has diffraction peaks at $2θ=17.9°±0.5°$, $19.1°±0.5°$, $29.1°±0.5°$, $29.8°±0.5°$ and has no diffraction peak at $30.9°±0.5°$ in the X-ray diffraction measurement. The configuration mentioned above allows the ion conductivity at 25° C. to be increased.

The diffraction peaks in the first crystalline structure may fall within the above-mentioned ranges of 2θ, further within the ranges of ±0.3°, or within the ranges of ±0.1°.

The X-ray diffraction measurement with the CuKα line used is made in accordance with the following procedure. The airtight sample holder for X-ray diffraction measurement is filled with the solid electrolyte powder to be subjected to the measurement under an argon atmosphere with a dew point of −50° C. or lower. Powder X-ray diffraction measurement is made with the use of an X-ray diffractometer ("MiniFlex II" from Rigaku Corporation). With a radiation source of a CuKα line, a tube voltage of 30 kV, a tube current of 15 mA, the diffracted X-ray is detected by a high-speed one-dimensional detector (model number: D/teX Ultra 2) through a KB filter with a thickness of 30 μm. The sampling width is 0.01°, the scan speed is 5°/min, the divergent slit width is 0.625°, the light-receiving slit width is 13 mm (OPEN), and the scattering slit width is 8 mm.

The crystalline structure with the crystal phase of $Li_7P_3S_{11}$ has diffraction peaks at the positions of $2θ=17.8°±0.5°$, $18.5°±0.5°$, $23.7°±0.5°$, $29.6°±0.5°$, and $30.0°±0.5°$ in the X-ray diffraction measurement with the CuKα line used.

Examples of the LGPS-type sulfide solid electrolyte include $Li_{10}GeP_2S_{12}$. The crystalline structure with the crystal phase of $Li_{10}GeP_2S_{12}$ has diffraction peaks at the positions of $2θ=14.4°±0.5°$, $20.1°±0.5°$, $20.4°±0.5°$, $26.9°±0.5°$, $29.5°±0.5°$, and $47.3°±0.5°$ in the X-ray diffraction measurement with the CuKα line used.

Examples of the argyrodite-type sulfide solid electrolyte include $Li_6PS_5Cl$. The crystalline structure with the crystal phase of $Li_6PS_5Cl$ has diffraction peaks at the positions of $2θ=15.6°±0.5°$, $25.5°±0.5°$, $30.0°±0.5°$, $31.4°±0.5°$, $45.0°±0.5°$, and $52.5°±0.5°$ in the X-ray diffraction measurement with the CuKα line used.

The crystalline structure with the crystal phase of $Li_4P_2S_6$ has diffraction peaks at positions $2θ=16.9°±0.5°$, $27.1°±0.5°$, $32.1°±0.5°$, and $32.5°±0.5°$ in the X-ray diffraction measurement with the CuKα line used.

The crystalline structure with the crystal phase of $ß-Li_3PS_4$ has diffraction peaks at the positions of $2θ=17.5°±0.5°$, $18.1°±0.5°$, $29.1°±0.5°$, $29.9°±0.5°$, and $31.2°±0.5°$ in the X-ray diffraction measurement with the CuKα line used.

The sulfide solid electrolyte preferably contains Li, P, S, N, and the element M. In this case, from the viewpoint of reduction resistance, the content ratio of the Li to the above P in the sulfide solid electrolyte is preferably 1.64 or more and 4.00 or less, more preferably 2.36 or more and 3.70 or less, further preferably 2.60 or more and 3.40 or less in terms of mole ratio. The content ratio of the N to the P is preferably 0.02 or more and 1.11 or less, more preferably 0.19 or more and 1.01 or less, further preferably 0.22 or more and 0.71 or less, particularly preferably 0.28 or more and 0.65 or less. When the content ratios of Li and N in the sulfide solid electrolyte fall within the ranges mentioned above, a sulfide solid electrolyte is obtained, which shows favorable reduction resistance. In addition, the first coulombic efficiency of the all-solid-state battery including the sulfide solid electrolyte can be increased.

Furthermore, from the viewpoint of atmospheric stability, the content ratio of the Li to the P is preferably 2.60 or more and 4.00 or less in terms of mole ratio, and the content ratio of the N to the P is preferably 0.19 or more and 1.11 or less in terms of mole ratio, and the content ratio of the Li to the P is more preferably 2.77 or more and 3.38 or less in terms of mole ratio, and the content ratio of the N to the P is more preferably 0.28 or more and 0.65 or less in terms of mole ratio. Further, Al is preferably contained as the element M. Thus, particularly in the case where the value of y in the general formula is less than 0.75, so-called cross-linked sulfur $P_2S_7^{4-}$ ($S_3P$—S—$PS_3$), which is unstable in the atmosphere, is reduced, substantially without containing $Li_2S$, which is likely to react with water, thus improving the atmospheric stability of the sulfide solid electrolyte, and making it possible to inhibit the generation of hydrogen sulfide through the reaction between moisture in the atmosphere and S in the sulfide solid electrolyte.

In particular, the content ratio of the Li to the P is preferably 2.77 or more and 3.38 or less in terms of mole ratio, whereas the content ratio of the N to the P is preferably 0.28 or more and 0.65 or less in terms of mole ratio, because the reduction resistance and atmospheric stability, and the ion conductivity at 25° C. can be increased at the same time.

In the case where the sulfide solid electrolyte contains Li, P, S, N, Ge, and the element M mentioned above and has a crystal phase of $Li_{10}GeP_2S_{12}$, from the viewpoint of reduction resistance, the content ratio of the Li to the P is preferably 5.01 or more and 5.61 or less in terms of mole ratio, and the content ratio of the N to the P is preferably 0.0051 or more and 0.41 or less in terms of mole ratio. In addition, the content ratio of the Li to the P is further preferably 5.06 or more and 5.19 or less in terms of mole ratio, and the content ratio of the N to the P is further preferably 0.038 or more and 0.13 or less in terms of mole ratio.

The sulfide solid electrolyte preferably has a composition represented by the general formula (100-z)(y$Li_2S$·(1-y)$P_2S_5$)·z$Li_\alpha M_\beta N$ (where 0<z≤40, 0.50≤y≤0.75). The sulfide solid electrolyte has a composition represented by the general formula mentioned above, the reduction resistance can be further improved. In addition, the first coulombic efficiency of the all-solid-state battery including the sulfide solid electrolyte can be further increased.

z in the general formula mentioned above is preferably more than 0 and 40 or less, more preferably 1 or more and 30 or less, further preferably 1 or more and 5 or less or 10 or more and 30 or less, further preferably 1 or more and 5 or less or 10 or more and 25 or less, z in the general formula falls within the range of more than 0 and 40 or less, thereby allowing the reduction resistance of the sulfide solid electrolyte to be further improved. With 10≤z≤40, so-called cross-linked sulfur $P_2S_7^{4-}$ ($S_3P$—S—$PS_3$), which is unstable in the atmosphere, is reduced, substantially without containing $Li_2S$, which is likely to react with water, thus improving the atmospheric stability of the sulfide solid electrolyte, and making it possible to inhibit the generation of hydrogen sulfide through the reaction between moisture in the atmosphere and S in the sulfide solid electrolyte. With 1≤z≤30, the ion conductivity at 25° C. can be further increased. With 1≤z≤5 or 10≤z≤30, the ion conductivity at 25° C. can be further increased. With 1≤z≤5 or 10≤z≤25, the ion conductivity at 25° C. can be further increased.

y in the general formula mentioned above is preferably 0.50 or more and 0.75 or less, more preferably 0.67 or more and 0.70 or less. When the content ratios of $Li_2S$ and $P_2S_5$ in the sulfide solid electrolyte falls within the range mentioned above, the ion conductivity of the sulfide solid electrolyte at 25° C. is improved.

α and β in the general formula mentioned above represent numerical values that provide stoichiometric ratios depending on the type of the element M. The values of α and β are not particularly limited, but may be, for example, 0.80≤α≤3.0 and 0.10≤β≤1.2. In particular, in the case where Al is contained as the element M, the values may be α=1.5 and β=0.5.

In the case where the sulfide solid electrolyte contains Ge, the sulfide solid electrolyte preferably has a composition represented by the general formula (100-z)$Li_{10}GeP_2S_{12}$·z$Li_\alpha M_\beta N$ (where 0<z≤50, α and β represent numerical values that provide stoichiometric ratios depending on the type of the element M). For example, in the case where Al is contained as the element M, the sulfide solid electrolyte preferably has a composition represented by the general formula (100-z)$Li_{10}GeP_2S_{12}$·z$Li_{3/2}Al_{1/2}N$ (where 0<z≤50). The sulfide solid electrolyte has such a composition, thereby allowing the ion conductivity at 25° C. to be increased.

z in the general formula mentioned above is more than 0 and 50 or less, preferably 1 or more and 45 or less, more preferably 3 or more and 35 or less, further preferably 5 or more and 25 or less, even more preferably 7 or more and 20 or less. When z in the general formula falls within the range mentioned above, the reduction resistance and the ion conductivity at 25° C. can be further improved.

α and β in the general formula mentioned above represent numerical values that provide stoichiometric ratios depending on the type of the element M. The values of α and β are not particularly limited, but may be, for example, 0.80≤α≤3.0 and 0.10≤β≤1.2. In particular, in the case where Al is contained as the element M, the values may be α=1.5 and β=0.5.

The ion conductivity of the sulfide solid electrolyte at 25° C. is preferably $0.4 \times 10^{-3}$ S/cm or more, more preferably $1.0 \times 10^{-3}$ S/cm or more, further preferably $1.5 \times 10^{-3}$ S/cm or more. When the ion conductivity of the sulfide solid electrolyte at 25° C. has the value mentioned above, the high rate discharge performance of the all-solid-state battery including the sulfide solid electrolyte can be improved.

As described above, the sulfide solid electrolyte can be suitably used as a solid electrolyte for an all-solid-state battery.

<All-Solid-State Battery>

The all-solid-state battery includes a negative electrode layer, a solid electrolyte layer, and a positive electrode layer. FIG. 1 is a schematic cross-sectional view illustrating an all-solid-state battery according to an embodiment of the present invention. The all-solid-state battery 10, which serves as a secondary battery, has a negative electrode layer 1 and a positive electrode layer 2 disposed with a solid electrolyte layer 3 interposed therebetween. The negative electrode layer 1 has a negative electrode substrate layer 4 and a negative composite layer 5, and the negative electrode substrate layer 4 serves as the outermost layer of the negative electrode layer 1. The positive electrode layer 2 has a positive electrode substrate layer 7 and a positive composite layer 6, and the positive electrode substrate layer 7 serves as the outermost layer of the positive electrode layer 2. For the all-solid-state battery 10 shown in FIG. 1, the positive composite layer 6, the solid electrolyte layer 3, the negative composite layer 5, and the negative electrode substrate layer 4 are stacked in this order on the positive electrode substrate layer 7.

In the all-solid-state battery, the negative electrode layer 1, the solid electrolyte layer 3, the positive electrode layer 2, or a combination thereof contains the sulfide solid electrolyte. In the all-solid-state battery, the negative electrode layer 1, the solid electrolyte layer 3, the positive electrode layer 2, or a combination thereof contains the sulfide solid electrolyte, and the first coulombic efficiency is thus excellent. Because the sulfide solid electrolyte has excellent reduction resistance, the negative electrode layer 1 and/or the solid electrolyte layer 3 preferably contain the sulfide solid electrolyte. The configuration mentioned above makes the effect of the present invention much greater.

The all-solid-state battery may be used in combination with other solid electrolytes besides the sulfide solid electrolyte. The other solid electrolytes may be sulfide solid electrolytes other than the sulfide solid electrolyte described above, or may be oxide solid electrolytes, dry polymer electrolytes, gel polymer electrolytes, or pseudo solid electrolytes.

The sulfide solid electrolytes other than the sulfide solid electrolyte described above preferably has high Li ion conductivity, and examples thereof can include $Li_2S—P_2S_5$, $Li_2S—P_2S_5—LiI$, $Li_2S—P_2S_5—LiCl$, $Li_2S—P_2S_5—LiBr$, $Li_2SP_2S_5—Li_2O$, $Li_2S—P_2S_5—Li_2O—LiI$, $Li_2S—P_2S_5—Li_3N$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_{2n}$ (where m and n represent positive numbers, Z represents any of Ge, Zn, and Ga), $Li_2S—GeS_2$, $Li_2S—SiS_2—Li_3PO_4$, $Li_2S—SiS_2—Li_\delta XO_\epsilon$ (where $\delta$ and $\epsilon$ represent positive numbers, X represents any of P, Si, Ge, B, Al, Ga, and In), and $Li_{10}GeP_2S_{12}$. Among these electrolytes, from the viewpoint of favorable lithium ion conductivity, $Li_2S—P_2S_5$ is preferable, and $xLi_2S\cdot(100-x)P_2S_5$ ($70 \leq x \leq 80$) is more preferable.

[Negative Electrode Layer]

The negative electrode layer 1 includes the negative electrode substrate layer 4 and the negative composite layer 5 stacked on the surface of the negative electrode substrate layer 4. The negative electrode layer 1 may have an intermediate layer, not shown, between the negative electrode substrate layer 4 and the negative composite layer 5.

(Negative Electrode Substrate Layer)

The negative electrode substrate layer 4 is a layer with conductivity. The material of the negative electrode substrate layer 4 is not limited as long as the material is a conductor. Examples of the material can include one or more metals selected from the group consisting of copper, aluminum, titanium, nickel, tantalum, niobium, hafnium, zirconium, zinc, tungsten, bismuth, antimony, gold, silver, iron, platinum, chromium, tin, and indium, and alloys containing one or more of these metals, as well as stainless-steel alloys.

The lower limit of the average thickness of the negative electrode substrate layer 4 is preferably 3 μm, more preferably 5 μm, further preferably 8 μm. The upper limit of the average thickness of the negative electrode substrate layer 4 is preferably 200 μm, more preferably 100 μm, further preferably 50 μm. The average thickness of the negative electrode substrate layer 4 is adjusted to be equal to or more than the lower limit mentioned above, thereby allowing the strength of the negative electrode substrate layer 4 to be sufficiently increased, and thus allowing the negative electrode layer 1 to be favorably formed. The average thickness of the negative electrode substrate layer 4 is adjusted to be equal to or less than the upper limit mentioned above, thereby allowing the volumes of other constituent elements to be sufficiently secured.

(Negative Composite Layer)

The negative composite layer 5 can be formed from a so-called negative composite including a negative active material. The negative composite may contain a negative electrode mixture or a negative electrode composite containing the negative active material and the sulfide solid electrolyte. The negative composite contains, if necessary, optional components such as a solid electrolyte other than the sulfide solid electrolyte, a conductive agent, a binder, and a filler.

<Negative Active Material>

As the negative active material, a material capable of occluding and releasing lithium ions is typically used. Specific negative active materials include:
- metals or semimetals such as Si and Sn;
- metal oxides or semimetal oxides, such as Si oxides and Sn oxides;
- polyphosphate compound;
- carbon materials such as graphite, non-graphitic carbon (graphitizable carbon or non-graphitizable carbon); and
- lithium metal composite oxides such as lithium titanate.

The lower limit of the content of the negative active material in the negative composite is preferably 10% by mass, more preferably 15% by mass. The upper limit of the content of the negative active material is preferably 60% by mass, more preferably 70% by mass, further preferably 80% by mass, particularly preferably 90% by mass, and may be 95% by mass. The content of the negative active material falls within the range mentioned above, thereby allowing the electric capacity of the all-solid-state battery to be increased.

<Negative Electrode Mixture or Negative Electrode Composite>

The negative electrode mixture is a mixture prepared by mixing the negative active material and the sulfide solid electrolyte by mechanical milling or the like. For example, the mixture of the negative active material and the sulfide solid electrolyte can be obtained by mixing the particulate negative active material and the particulate sulfide solid electrolyte.

Examples of the negative electrode composite include a composite with a chemical or physical bond between the negative active material and the sulfide solid electrolyte, and a composite mechanically formed from the negative active material and the sulfide solid electrolyte. The composite mentioned above has the negative active material and the sulfide solid electrolyte present in one particle, and examples of the composite include an aggregate formed by the negative active material and the sulfide solid electrolyte, and the negative active material with a film containing the sulfide solid electrolyte, formed on at least a part of the surface of the material.

The negative electrode mixture or the negative composite may contain a solid electrolyte other than the sulfide solid electrolyte.

The negative active material and the sulfide solid electrolyte contained in the negative composite constitute the negative electrode mixture or the negative electrode composite, thereby allowing the reduction resistance to be improved while maintaining high ion conductivity, and thus resulting in an excellent first coulombic efficiency.

In the case where the negative composite contains a solid electrolyte, the lower limit of the content of the solid electrolyte in the negative composite may be 5% by mass, and is preferably 10% by mass. The upper limit of the content of the solid electrolyte in the negative composite is preferably 90% by mass, more preferably 85% by mass, further preferably 80% by mass, particularly preferably 75% by mass. The content of the solid electrolyte falls within the range mentioned above, thereby allowing the electric capacity of the all-solid-state battery to be increased.

In the case where the negative electrode layer contains the sulfide solid electrolyte, the lower limit of the content of the sulfide solid electrolyte in the negative composite may be 5% by mass, and is preferably 10% by mass. The upper limit of the content of the sulfide solid electrolyte in the negative composite is preferably 90% by mass, more preferably 85% by mass, further preferably 80% by mass, particularly preferably 75% by mass. The content of the sulfide solid electrolyte in the negative composite falls within the range mentioned above, thereby allowing the first coulombic efficiency of the all-solid-state battery to be further improved in the case where the negative electrode layer contains the sulfide solid electrolyte.

<Other Optional Components>

The conductive agent mentioned above is not particularly limited. Examples of such a conductive agent include natural or artificial graphite, carbon black such as furnace black, acetylene black, and ketjen black, metals, and conductive ceramics. Examples of the form of the conductive agent include powdery and fibrous forms. The content of the conductive agent in the negative composite can be, for example, 0.5% by mass or more and 30% by mass or less. The negative composite may contain no conductive agent.

The binder (binding agent) mentioned above is not particularly limited. Examples of the binder include thermoplastic resins such as fluororesins (polytetrafluoroethylene (PTFE), polyvinylidene fluoride (PVDF), etc.), polyethylene, polypropylene, polyimide, and polyacrylic acid; elastomers such as an ethylene-propylene-diene rubber (EPDM), sulfonated EPDM, a styrene-butadiene rubber (SBR), and fluororubber; and polysaccharide polymers.

The filler mentioned above is not particularly limited. Examples of the main component of the filler include polyolefins such as polypropylene and polyethylene, silica, alumina, zeolite, glass, and carbon.

The lower limit of the average thickness of the negative composite layer 5 is preferably 30 μm, more preferably 60 μm. The upper limit of the average thickness of the negative composite layer 5 is preferably 1000 μm, more preferably 500 μm, further preferably 200 μm. The average thickness of the negative composite layer 5 is adjusted to be equal to or more than the lower limit mentioned above, thereby making it possible to obtain an all-solid-state battery with a high energy density. The average thickness of the negative composite layer 5 is adjusted to be equal to or less than the upper limit mentioned above, thereby making it possible to obtain an all-solid-state battery including a negative electrode that is excellent in high rate discharge performance and high in active material utilization.

(Intermediate Layer)

The intermediate layer mentioned above, which is a coating layer on the surface of the negative electrode substrate layer 4, includes conductive particles such as carbon particles, thereby reducing the contact resistance between the negative electrode substrate layer 4 and the negative composite layer 5. The structure of the intermediate layer is not particularly limited, and can be formed from, for example, a composition containing a resin binder and conductive particles.

[Positive Electrode Layer]

The positive electrode layer 2 includes the positive electrode substrate layer 7 and the positive composite layer 6 stacked on the surface of the positive electrode substrate layer 7. Like the negative electrode layer 1, the positive electrode layer 2 may have an intermediate layer between the positive electrode substrate layer 7 and the positive composite layer 6. This intermediate layer may have the same structure as the intermediate layer of the negative electrode layer 1.

(Positive Electrode Substrate Layer)

The positive electrode substrate layer 7 may have the same structure as the negative electrode substrate layer 4. The material of the positive electrode substrate layer 7 is not limited as long as the material is a conductor. Examples of the material can include one or more metals selected from the group consisting of copper, aluminum, titanium, nickel, tantalum, niobium, hafnium, zirconium, zinc, tungsten, bismuth, antimony, gold, silver, iron, platinum, chromium, tin, and indium, and alloys containing one or more of these metals, as well as stainless-steel alloys.

The lower limit of the average thickness of the positive electrode substrate layer 7 is preferably 3 μm, more preferably 5 μm. The upper limit of the average thickness of the positive electrode substrate layer 7 is preferably 200 μm, more preferably 100 μm, further preferably 50 μm. The average thickness of the positive electrode substrate layer 7 is adjusted to be equal to or more than the lower limit mentioned above, thereby allowing the strength of the positive electrode substrate layer 7 to be sufficiently increased, and thus allowing the positive electrode layer 2 to be formed favorably. The average thickness of the positive electrode substrate layer 7 is adjusted to be equal to or less than the upper limit mentioned above, thereby allowing the volumes of the other constituent elements to be sufficiently secured.

(Positive Composite Layer)

The positive composite layer 6 can be formed from a so-called positive composite including a positive active material. The positive composite may contain a positive electrode mixture or a positive electrode composite including a positive active material and a solid electrolyte. As the solid electrolyte, the sulfide solid electrolyte may be used, but it is more preferable to use a solid electrolyte that has high oxidation resistance. Like the negative composite, the positive composite that forms the positive composite layer 6 includes optional components such as a solid electrolyte, a conductive agent, a binder, and a filler, if necessary. It is to be noted that the positive composite layer may have a form containing no solid electrolyte.

<Positive Active Material>

As the positive active material included in the positive composite layer 6, known materials typically for use in all-solid-state batteries can be used. Examples of the positive active material include composite oxides represented by $Li_xMeO_y$ (Me represents at least one transition metal) ($Li_xCoO_2$, $Li_xNiO_2$, $Li_xMnO_3$, $Li_xNi_\alpha Co_{(1-\alpha)}O_2$, $Li_xNi_\alpha Mn_\beta Co_{(1-\alpha-\beta)}O_2$, and the like that have a layered α-NaFeO$_2$-type crystalline structure, and $Li_xMn_2O_4$, $Li_xNi_\alpha Mn_{(2-\alpha)}O_4$, and the like that have a spinel-type crystalline structure), and polyanion compounds represented by $Li_wMe_x(AO_y)_z$ (Me represents at least one transition metal, and A represents, for example, P, Si, B, V, or the like) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$, and the like) The elements or polyanions in these compounds may be partially substituted with other elements or anion species. In the positive active material layer, one of these compounds may be used alone, or two or more of these compounds may be used in mixture.

Lithium alloys such as Li—Al, Li—In, Li—Sn, Li—Pb, Li—Bi, Li—Ga, Li—Sr, Li—Si, Li—Zn, Li—Cd, Li—Ca, and Li—Ba, and materials that are more electropositive in oxidation-reduction potential than the negative electrode material, other than the compounds represented by the general formulas mentioned above, such as $MnO_2$, $FeO_2$, $TiO_2$, $V_2O_5$, $V_6O_{13}$, and $TiS_2$ can be used as the positive active material.

The lower limit of the content of the positive active material in the positive composite is preferably 10% by mass, more preferably 15% by mass. The upper limit of the content of the positive active material is preferably 60% by mass, more preferably 70% by mass, further preferably 80% by mass, particularly preferably 90% by mass, and may be 95% by mass. The content of the positive active material falls within the range mentioned above, thereby allowing the electric capacity of the all-solid-state battery to be increased.

<Positive Electrode Mixture or Positive Electrode Composite>

The positive electrode mixture is a mixture prepared by mixing the positive active material and a solid electrolyte or the like by mechanical milling or the like, as in the case of the negative electrode. For example, the mixture of the positive active material and the solid electrolyte or the like can be obtained by mixing the particulate positive active material and the particulate solid electrolyte or the like.

Examples of the positive electrode composite also include, as in the case of the negative electrode, a composite with a chemical or physical bond between the positive active material and the solid electrolyte or the like, and a composite mechanically formed from the positive active material and the solid electrolyte or the like. The composite mentioned above has the positive active material and the solid electrolyte or the like present in one particle, and examples of the composite include an aggregate formed by the positive active material and the solid electrolyte or the like, and the positive active material with a film containing the solid electrolyte or the like, formed on at least a part of the surface of the material.

The positive active material and the solid electrolyte or the like contained in the positive composite constitute the positive electrode mixture or the positive electrode composite, thereby allowing a high ion conductivity to be maintained. Further, as the solid electrolyte, the sulfide solid electrolyte may be used, but it is more preferable to use a solid electrolyte that has high oxidation resistance.

In the case where the positive composite contains a solid electrolyte, the lower limit of the content of the solid electrolyte may be 5% by mass, and is preferably 10% by mass. The upper limit of the content of the solid electrolyte in the positive composite is preferably 90% by mass, more preferably 85% by mass, further preferably 80% by mass, particularly preferably 75% by mass. The content of the solid electrolyte falls within the range mentioned above, thereby allowing the electric capacity of the all-solid-state battery to be increased.

The lower limit of the average thickness of the positive composite layer 6 is preferably 30 μm, more preferably 60 μm. The upper limit of the average thickness of the positive composite layer 6 is preferably 1000 μm, more preferably 500 μm, further preferably 200 μm. The average thickness of the positive composite layer 6 is adjusted to be equal to or more than the lower limit mentioned above, thereby making it possible to obtain an all-solid-state battery with a high energy density. The average thickness of the positive composite layer 6 is adjusted to be equal to or less than the upper limit mentioned above, thereby making it possible to obtain an all-solid-state battery including a negative electrode that is excellent in high rate discharge performance and high in active material utilization.

[Solid Electrolyte Layer]

The solid electrolyte layer 3 contains an electrolyte for solid electrolyte layers. Examples of the electrolyte for solid electrolyte layers can include oxide solid electrolytes, other sulfide solid electrolytes, dry polymer electrolytes, gel polymer electrolytes, and pseudo solid electrolytes, besides the sulfide solid electrolyte described above. Among these electrolytes, from viewpoints such as favorable ion conductivity and easy interface formation, sulfide solid electrolytes are preferable, and the sulfide solid electrolyte described above is more preferable. The solid electrolyte layer 3 contains the sulfide solid electrolyte, thereby causing the solid electrolyte layer to improve the reduction resistance while maintaining a high ion conductivity, and thus the first coulombic efficiency of the all-solid-state battery to be improved.

The electrolyte for solid electrolyte layers may have a crystalline structure, or may be amorphous without having a crystalline structure. Oxides such as $Li_3PO_4$, halogens, halogen compounds, and the like may be added to the electrolyte for solid electrolyte layers.

The lower limit of the average thickness of the solid electrolyte layer 3 is preferably 1 μm, more preferably 3 μm. The upper limit of the average thickness of the solid electrolyte layer 3 is preferably 50 μm, more preferably 20 μm. The average thickness of the solid electrolyte layer 3 is adjusted to be equal to or more than the lower limit mentioned above, thereby making it possible to reliably insulate the positive electrode and the negative electrode. The average thickness of the solid electrolyte layer 3 is adjusted to be equal to or less than the upper limit mentioned above, making it possible to increase the energy density of the all-solid-state battery.

[Method for Manufacturing all-Solid-State Battery]

The method for manufacturing the all-solid-state battery mainly includes, for example, a sulfide solid electrolyte preparation step of preparing the sulfide solid electrolyte, a negative composite preparation step, a step of preparing an electrolyte for solid electrolyte layers, a positive composite preparation step, and a stacking step of stacking a negative electrode layer, a solid electrolyte layer, and a positive electrode layer.

(Sulfide Solid Electrolyte Preparation Step)

In this step, the sulfide solid electrolyte is prepared, for example, in accordance with the following procedure.

(1) Preparation of Nitride ($Li_{3/2}Al_{1/2}N$)

$Li_3N$ and AlN are mixed in a mortar or the like, and then pelletized. Next, a heat treatment is performed to prepare $Li_{3/2}Al_{1/2}N$. It is to be noted that in general, "$Li_{3/2}Al_{1/2}N$" is written as "$Li_3AlN_2$".

(2) Preparation of Sulfide Solid Electrolyte

After mixing the above-mentioned $Li_{3/2}Al_{1/2}N$, $Li_2S$, and $P_2S_5$ that have predetermined mole ratios in a mortar or the like, a sulfide solid electrolyte precursor is prepared. As a method for preparing the sulfide solid electrolyte precursor, for example, a mechanical milling method, a melt quenching method, or the like can be used.

In the case of preparing a sulfide solid electrolyte, the sulfide solid electrolyte can be prepared by, after the preparation of the sulfide solid electrolyte precursor, subjecting the precursor to a heat treatment at a crystallization temperature or higher.

The crystallization temperature can be determined by measurement with a differential scanning calorimeter (DSC). For example, in order to obtain a $Li_7P_3S_{11}$ crystalline structure, the heat treatment temperature is preferably 250° C. or higher and 400° C. or lower, and in order to obtain a ß-$Li_3PS_4$ crystalline structure, the heat treatment temperature is preferably 200° C. or higher and 400° C. or lower. This is because a phase transition to $Li_4P_2S_6$, which is a stable phase, may be caused in the case of a heat treatment at a high temperature such as 500° C. For example, in order to obtain the first crystalline structure that has diffraction peaks at 2θ=17.9°±0.5°, 19.1°±0.5°, 29.1°±0.5°, and 29.8°±0.5° in X-ray diffraction measurement with a CuKα line, the heat treatment temperature is preferably 250° C. or higher and 400° C. or lower.

It is to be noted that while a case of preparing the sulfide solid electrolyte containing Al as the element M has been described in the preparation step mentioned above, a sulfide solid electrolyte that contains at least one element M selected from the group consisting of Si, B, Mg, Zr, Ti, Hf, Ca, Sr, Sc, Ce, Ta, Nb, W, Mo, and V, and N has a crystalline structure can be prepared by the same approach as the preparation step mentioned above. For example, a sulfide solid electrolyte containing elements such as B and Si, and N can be prepared with the use of $Li_{3/2}B_{1/2}N$, $Li_{5/3}Si_{1/3}N$, $Li_{9/5}Si_{3/10}N$, or the like instead of $Li_{3/2}Al_{1/2}N$ as the nitride in the preparation step mentioned above. Examples of the nitride that can be used in the preparation step mentioned above can further include LiMgN, LiCaN, $LiHf_{1/2}N$, $Li_{3/2}Sc_{1/2}N$, $LiZr_{1/2}N$, $Li_{5/3}Ti_{1/3}N$, $Li_{4/3}Ta_{1/3}N$, $Li_{7/4}Ta_{1/4}N$, $Li_{7/4}Nb_{1/4}N$, $Li_{3/2}W_{1/4}N$, and $Li_{7/4}V_{1/4}N$, besides the above-mentioned nitrides.

In addition, the nitride composed of the element M, Li, and N is used as a starting material in the preparation step mentioned above, but the method for producing the sulfide solid electrolyte according to the present embodiment is not limited thereto.

Although the $Li_2S$—$P_2S_5$-based sulfide solid electrolyte has been described as an example in the preparation step mentioned above, the sulfide solid electrolyte can be prepared in accordance with a similar preparation step even in the case of an LGPS-type or argyrodite-type sulfide solid electrolyte.

For example, $Li_{3/2}Al_{1/2}N$, $Li_2S$, and $P_2S_6$ are used as starting materials in the preparation step mentioned above, but the solid sulfide electrolyte of a LGPS type containing Ge may be prepared by further adding a Ge-containing compound such as $GeS_2$.

More specifically, starting materials that have predetermined mole ratios are mixed in a mortar or the like, and then subjected to mechanical milling, for example, a ball-mill treatment or a vibration-mill treatment to prepare a sulfide solid electrolyte precursor. Thereafter, the precursor is subjected to a heat treatment at a predetermined temperature or higher, thereby allowing a sulfide solid electrolyte to be prepared.

For example, in the case of preparing a sulfide solid electrolyte that has a $Li_{10}GeP_2S_{12}$ crystalline structure, the heat treatment temperature is preferably 300° C. or higher and 1000° C. or lower, more preferably 350° C. or higher and 700° C. or lower, more preferably 400° C. or higher and 650° C. or lower, particularly preferably 450° C. or higher and 600° C. or lower. The heat treatment may be performed under a reduced-pressure atmosphere or under an inert gas atmosphere.

(Negative Composite Preparation Step)

In this step, a negative composite for forming the negative electrode layer is prepared. In the case where the negative composite contains a mixture or a composite including the negative active material and the sulfide solid electrolyte, this step includes, for example, using a mechanical milling method or the like to mix the negative active material and the sulfide solid electrolyte and prepare a mixture or a composite of the negative active material and the sulfide solid electrolyte.

(Step of Preparing Electrolyte for Solid Electrolyte Layer)

In this step, the electrolyte for solid electrolyte layers for forming the solid electrolyte layer is prepared. In this step, the electrolyte can be obtained through treatment of predetermined materials for the electrolyte for solid electrolyte layers by a mechanical milling method. The electrolyte for solid electrolyte layers may be prepared by heating predetermined materials for the electrolyte for solid electrolyte layers to the melting temperature or higher to melt and mix the both materials at a predetermined ratio and quench the mixture in accordance with a melt quenching method. Other methods for synthesizing the electrolyte for solid electrolyte layers include a solid phase method of sealing under reduced pressure and firing, a liquid phase method such as dissolution-precipitation, a gas phase method (PLD), and firing under an argon atmosphere after mechanical milling. It is to be noted that in the case where the electrolyte for solid electrolyte layers is the sulfide solid electrolyte, the above-mentioned sulfide solid electrolyte preparation step is performed in the step for preparing the electrolyte for solid electrolyte layers.

(Positive Composite Preparation Step)

In this step, a positive composite for forming the positive electrode layer is prepared. The method for preparing the positive composite is not particularly limited, and may be selected appropriately depending on the purpose. Examples of the method include compression molding of the positive active material, mechanical milling treatment of predetermined materials for the positive composite, and sputtering with a target material for the positive active material. In the case where the positive composite contains a mixture or a composite including the positive active material and the sulfide solid electrolyte, this step includes, for example, using a mechanical milling method or the like to mix the positive active material and the sulfide solid electrolyte and prepare a mixture or a composite of the positive active material and the sulfide solid electrolyte.

(Stacking Step)

In this step, the negative electrode layer including the negative electrode substrate layer and the negative composite layer, the solid electrolyte layer, and the positive electrode layer including the positive electrode substrate layer and the positive composite layer are stacked. In this step, the negative electrode layer, the solid electrolyte layer, and the positive electrode layer may be formed in sequence, or vice versa, and the order of forming the respective layers is not particularly limited. The negative electrode layer is formed by pressure molding of the negative electrode substrate and the negative composite, the solid electrolyte layer is formed by pressure molding of the electrolyte for solid electrolyte layers, and the positive electrode layer is formed by pressure molding of the positive electrode substrate and the positive composite.

The negative electrode layer, the solid electrolyte layer, and the positive electrode layer may be stacked by pressure molding of the negative electrode substrate, the negative composite, the electrolyte for solid electrolyte layers, the positive electrode substrate, and the positive composite at the same time. The positive electrode layer, the negative electrode layer, or these layers may be molded in advance, and subjected to pressure molding with the solid electrolyte layer to stack the layers.

OTHER EMBODIMENTS

The present invention is not to be considered limited to the embodiment mentioned above, and can be put into practice in various modified and improved aspects, besides the aspects mentioned above.

The configuration of the all-solid-state battery according to the present invention is not to be considered particularly limited, and may include other layers such as an intermediate layer and an adhesive layer, besides the negative electrode layer, the positive electrode layer, and the solid electrolyte layer.

EXAMPLES

Hereinafter, the present invention will be described more specifically with reference to examples, but the present invention is not to be considered limited to the following examples.

Example 1

$99(0.70Li_2S \cdot 0.30P_2S_5) \cdot 1Li_{3/2}Al_{1/2}N$ was synthesized by the following treatment.

$Li_3N$ and AlN were weighed so as to be 1.2:1 in terms of mole ratio, mixed in a mortar, and then pelletized. Next, $Li_{3/2}Al_{1/2}N$ was prepared by heat treatment at 750° C. for 1 hour. It was confirmed by XRD measurement that the main phase of the prepared $Li_{3/2}Al_{1/2}N$ was $Li_{3/2}Al_{1/2}N$.

Next, in a glove box in an argon atmosphere with a dew point of −50° C. or lower, $Li_2S$ (99.98%, Aldrich), $P_2S_5$ (99%, Aldrich), and $Li_{3/2}Al_{1/2}N$ were weighed so as to be 69.3:29.7:1.0 in terms of mole ratio, and then mixed in a mortar. This mixed sample was put in a hermetically sealed 80 mL zirconia pot containing 160 g of zirconia balls with a diameter of 4 mm. The sample was subjected to milling for 45 hours at a revolution speed of 510 rpm with a planetary ball mill (from FRITSCH, model number: Premium line P-7). The milled sample was subjected to a heat treatment for 2 hours to obtain a sulfide solid electrolyte according to Example 1. This heat treatment was performed at a temperature that was equal to or higher than the crystallization temperature and not 100° C. higher than the crystallization temperature. The crystallization temperature was determined by measuring the DSC. The DSC measurement was made under the following conditions. More specifically, the temperature was raised from room temperature to 400° C. at 10° C./min with the use of a DSC device (Thermo Plus DSC8230 from Rigaku Corporation) and a hermetically sealed pan made of SUS.

Examples 2 to 9

Sulfide solid electrolytes according to Examples 2 to 9 were synthesized similarly to Example 1 except that the value of z in the compositional formula $(100-z)(0.70Li_2S \cdot 0.30P_2S_5) \cdot zLi_{3/2}Al_{1/2}N$ of the sulfide solid electrolyte was changed to 5, 7, 10, 15, 20, 25, 30, and 40.

Example 10

A sulfide solid electrolyte according to Example 10 was synthesized similarly to Example 1 except that $Li_2S$, $P_2S_6$, and $Li_{3/2}Al_{1/2}N$ were weighed as raw materials for the sulfide solid electrolyte so as to be $Li_2S:P_2S_5:Li_{3/2}Al_{1/2}N=67.5:22.5:10.0$ (mol %).

Example 11

A sulfide solid electrolyte according to Example 11 was synthesized similarly to Example 1 except that $Li_2S$, $P_2S_5$, and $Li_{3/2}Al_{1/2}N$ were weighed as raw materials for the sulfide solid electrolyte so as to be $Li_2S:P_2S_5:Li_{3/2}Al_{1/2}N=35.0:35.0:30.0$ (mol %).

Example 12

A sulfide solid electrolyte according to Example 12 was synthesized similarly to Example 1 except that $Li_2S$, $P_2S_6$, and $Li_{3/2}Al_{1/2}N$ were weighed as raw materials for the sulfide solid electrolyte so as to be $Li_2S:P_2S_5:Li_{3/2}Al_{1/2}N=53.6:26.4:20.0$ (mol %).

Example 13

A sulfide solid electrolyte according to Example 13 was synthesized similarly to Example 1 except that $Li_2S$, $P_2S_5$, and $Li_{3/2}Al_{1/2}N$ were weighed as raw materials for the sulfide solid electrolyte so as to be $Li_2S:P_2S_5:Li_{3/2}Al_{1/2}N=50.3:24.7:25.0$ (mol %).

Example 14

A sulfide solid electrolyte according to Example 14 was synthesized similarly to Example 1 except that $Li_2S$, $P_2S_5$, and $Li_{3/2}Al_{1/2}N$ were weighed as raw materials for the sulfide solid electrolyte so as to be $Li_2S:P_2S_5:Li_{3/2}Al_{1/2}N=46.9:23.1:30$ (mol %).

Examples 15 to 18

$Li_3N$ and BN were weighed so as to be 1.1:1 in terms of mole ratio, mixed in a mortar, then pelletized, and then subjected to a heat treatment at 800° C. for 10 minutes to prepare $Li_{3/2}B_{1/2}N$. It was confirmed by XRD measurement that the main phase of the prepared $Li_{3/2}B_{1/2}N$ was $Li_{3/2}B_{1/2}N$.

Next, sulfide solid electrolytes according to Examples 15 to 18 were synthesized similarly to Example 1 except that the $Li_{3/2}B_{1/2}N$ was used instead of $Li_{3/2}Al_{1/2}N$ and that the value of z in the compositional formula $(100-z)(0.70Li_2S \cdot 0.30P_2S_5) \cdot zLi_{3/2}B_{1/2}N$ of the sulfide solid electrolyte was changed to 1, 10, 20, and 30.

Examples 19 to 23

$Li_3N$ and $Si_3N_4$ were weighed so as to be 5.1:1 in terms of mole ratio, mixed in a mortar, then pelletized, and then subjected to a heat treatment at 800° C. for 10 minutes to prepare $Li_{5/3}Si_{1/3}N$. It was confirmed by XRD measurement that the main phase of the prepared $Li_{5/3}Si_{1/3}N$ was $Li_{5/3}Si_{1/3}N$.

Sulfide solid electrolytes according to Examples 19 to 23 were synthesized similarly to Example 1 except that the $Li_{5/3}Si_{1/3}N$ was used instead of $Li_{3/2}Al_{1/2}N$ and that the value of z in the compositional formula $(100-z)(0.70Li_2S \cdot 0.30P_2S_5) \cdot zLi_{5/3}Si_{1/3}N$ of the sulfide solid electrolyte was changed to 1.5, 15, 20, 30, and 45.

Comparative Example 1

A sulfide solid electrolyte according to Comparative Example 1 was synthesized similarly Example 1 except that $Li_{3/2}Al_{1/2}N$ was not used as a raw material for the sulfide solid electrolyte.

Reference Example 1

$75Li_2S \cdot 25P_2S_5(Li_3PS_4)$ were synthesized by a mechanical milling method. In a glove box in an argon atmosphere with a dew point of −50° C. or lower, Li$_2$S and P$_2$S$_5$ as raw materials for the sulfide solid electrolyte were weighed so as to be Li$_2$S:P$_2$S$_5$=75:25 (mol %), and then mixed in an agate mortar. This mixture was put in a hermetically sealed 80 mL zirconia pot containing 160 g of zirconia balls with a diameter of 4 mm. The sample was subjected to milling for 45 hours at a revolution speed of 510 rpm with a planetary ball mill (from FRITSCH, model number: Premium line P-7). The sulfide solid electrolyte according to Reference Example 1 was obtained by the treatment mentioned above.

Reference Example 2

A sulfide solid electrolyte according to Reference Example 2 was synthesized similarly to Example 1 except that the Li$_3$N was used instead of Li$_{3/2}$Al$_{1/2}$N and that the value of z in the compositional formula (100−z)(0.70Li$_2$S·0.30P$_2$S$_5$)·zLi$_3$N of the sulfide solid electrolyte was changed to 20.

Example 24

87.6(Li$_{10}$GeP$_2$S$_{12}$)·12.4Li$_{3/2}$Al$_{1/2}$N was synthesized by the following treatment.

Li$_3$N and AlN were weighed so as to be 1.2:1 in terms of mole ratio, mixed in a mortar, and then pelletized. Next, Li$_{3/2}$Al$_{1/2}$N was prepared by heat treatment at 750° C. for 1 hour.

Next, in a glove box in an argon atmosphere with a dew point of −50° C. or lower, Li$_2$S (99.98%, Aldrich), P$_2$S$_5$ (99%, Aldrich), GeS$_2$ (99.99%, Kojundo Chemical Laboratory Co., Ltd.), and Li$_{3/2}$Al$_{1/2}$N were weighed so as to be 5:1:1:0.14 in terms of mole ratio, and then mixed in a mortar. This mixed sample was put in a hermetically sealed 80 mL zirconia pot containing 160 g of zirconia balls with a diameter of 4 mm. The sample was subjected to milling for 40 hours at a revolution speed of 370 rpm with a planetary ball mill (from FRITSCH, model number: Premium line P-7). Thereafter, the milled sample was subjected to a heat treatment at 550° C. for 8 hours to obtain a sulfide solid electrolyte according to Example 24.

Example 25, Example 26, Comparative Example 2

Sulfide solid electrolytes according to Example 25, Example 26, and Comparative Example 2 were synthesized similarly to Example 1 except that the value of z in the compositional formula (100−z)(Li$_{10}$GeP$_2$S$_{12}$)·zLi$_{3/2}$Al$_{1/2}$N of the sulfide solid electrolyte was changed to 30.2, 42.5, and 60.9.

Comparative Example 3

A sulfide solid electrolyte according to Comparative Example 3 was synthesized similarly Example 24 except that Li$_{3/2}$Al$_{1/2}$N was not used as a raw material for the sulfide solid electrolyte.

Reference Example 3

A sulfide solid electrolyte according to Reference Example 3 was synthesized similarly Example 24 except for using Li$_2$O (99%, Kojundo Chemical Laboratory Co., Ltd.) as a raw material for the sulfide solid electrolyte instead of Li$_{3/2}$Al$_{1/2}$N, and weighing so as to be Li$_2$S:P$_2$S$_5$:GeS$_2$:Li$_2$O=4.86:1:1:0.14 (mol %).

Reference Example 4

A sulfide solid electrolyte according to Reference Example 4 was synthesized similarly Example 24 except for using Al$_2$S$_3$ (98%, Aldrich) as a raw material for the sulfide solid electrolyte instead of Li$_{3/2}$Al$_{1/2}$N, and weighing so as to be Li$_2$S:P$_2$S$_5$:GeS$_2$:Al$_2$S$_3$=5:1:0.93:0.035 (mol %).

[Evaluation]

(1) XRD Analysis

X-ray diffraction measurement was made by the following method. With the use of airtight sample holder for X-ray diffraction measurement, the sulfide solid electrolyte powders according to the examples and comparative examples were packed under an argon atmosphere with a dew point of −50° C. or lower. Powder X-ray diffraction measurement was made with the use of an X-ray diffractometer ("miniFlex II" from Rigaku Corporation). The radiation source was a CuKα line, the tube voltage was 30 kV, the tube current was 15 mA, and diffracted X-rays were detected by a high-speed one-dimensional detector (model number: D/teX Ultra 2) through a Kβ filter with a thickness of 30 μm. The sampling width was 0.01°, the scan speed was 5°/min, the divergent slit width was 0.625°, the light receiving slit width was 13 mm (OPEN), and the scattering slit width was 8 mm.

Figure 2:
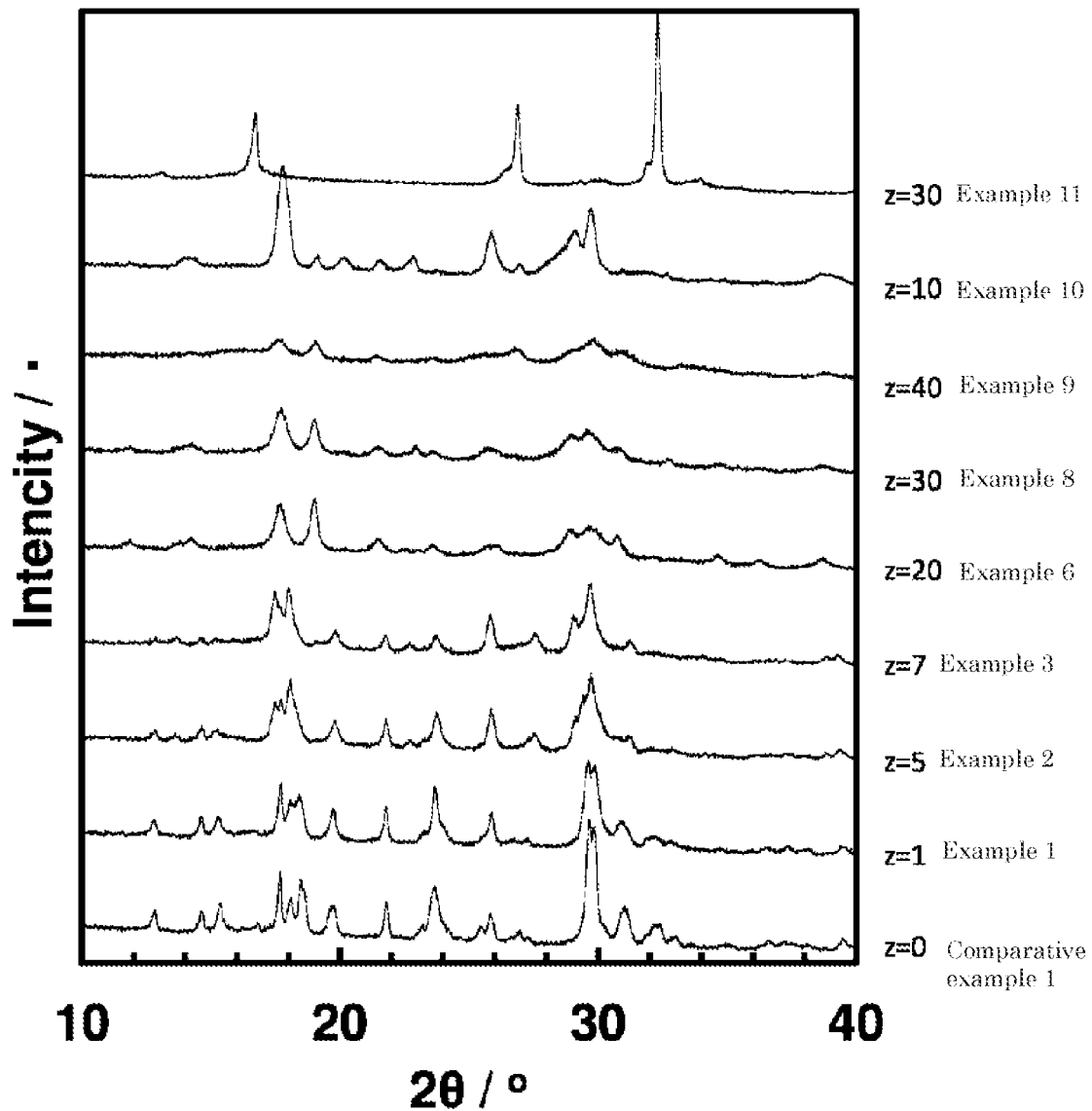
FIG. 2 is X-ray diffraction (XRD) spectra of sulfide solid electrolytes according to examples and a comparative example.

FIG. 2 shows the X-ray diffraction (XRD) spectra of Examples 1 to 3, 6, 8, 9, 10, and 11 and Comparative Example 1 in the range of 2θ=10° to 40°. Table 1 shows the crystalline structures identified from the XRD spectra of Examples 1 to 23, Comparative Example 1, and Reference Example 2.

Figure 8:
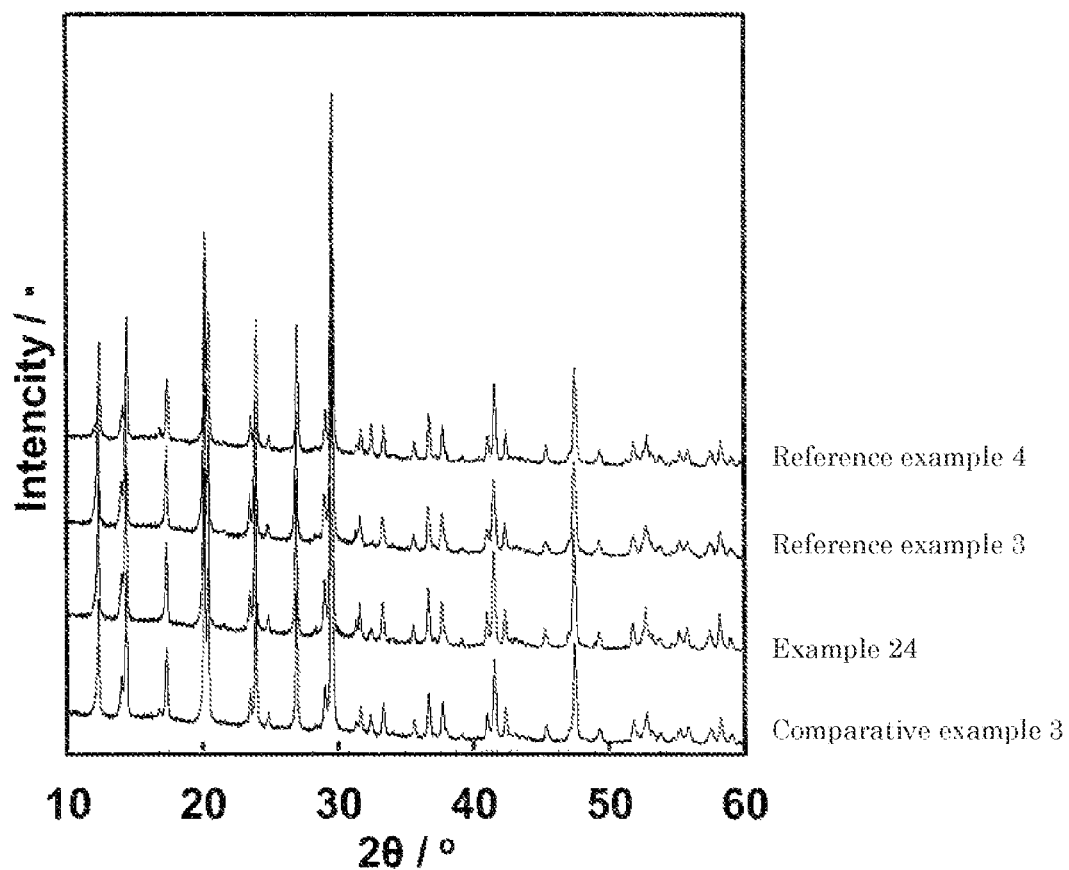
FIG. 8 is X-ray diffraction (XRD) spectra of sulfide solid electrolytes according to an example, a comparative example, and reference examples.

FIG. 8 shows the X-ray diffraction (XRD) spectra of Example 24, Comparative Example 3, and Reference Examples 3 and 4 in the range of 2θ=10° to 60°. Table 2 shows the crystalline structures identified from the XRD spectra of Examples 24 to 26, Comparative Examples 2 and 3, and Reference Examples 3 and 4. It is to be noted that, "Unknown" in Table 2 indicates that a diffraction peak from which any crystalline structure failed to be identified was observed.

(2) Raman Spectroscopic Analysis

Raman spectra were measured by the following method. With the use of a laser Raman spectrophotometer ("LabRAM HR Revolution" manufactured by Horiba, Ltd.), Raman spectrometry was performed in the wave number range of 100 cm$^{-1}$ to 1800 cm$^{-1}$ under the conditions of excitation laser wavelength: 532 nm (YAG laser) and grating 600 gr/mm.

Figure 3:
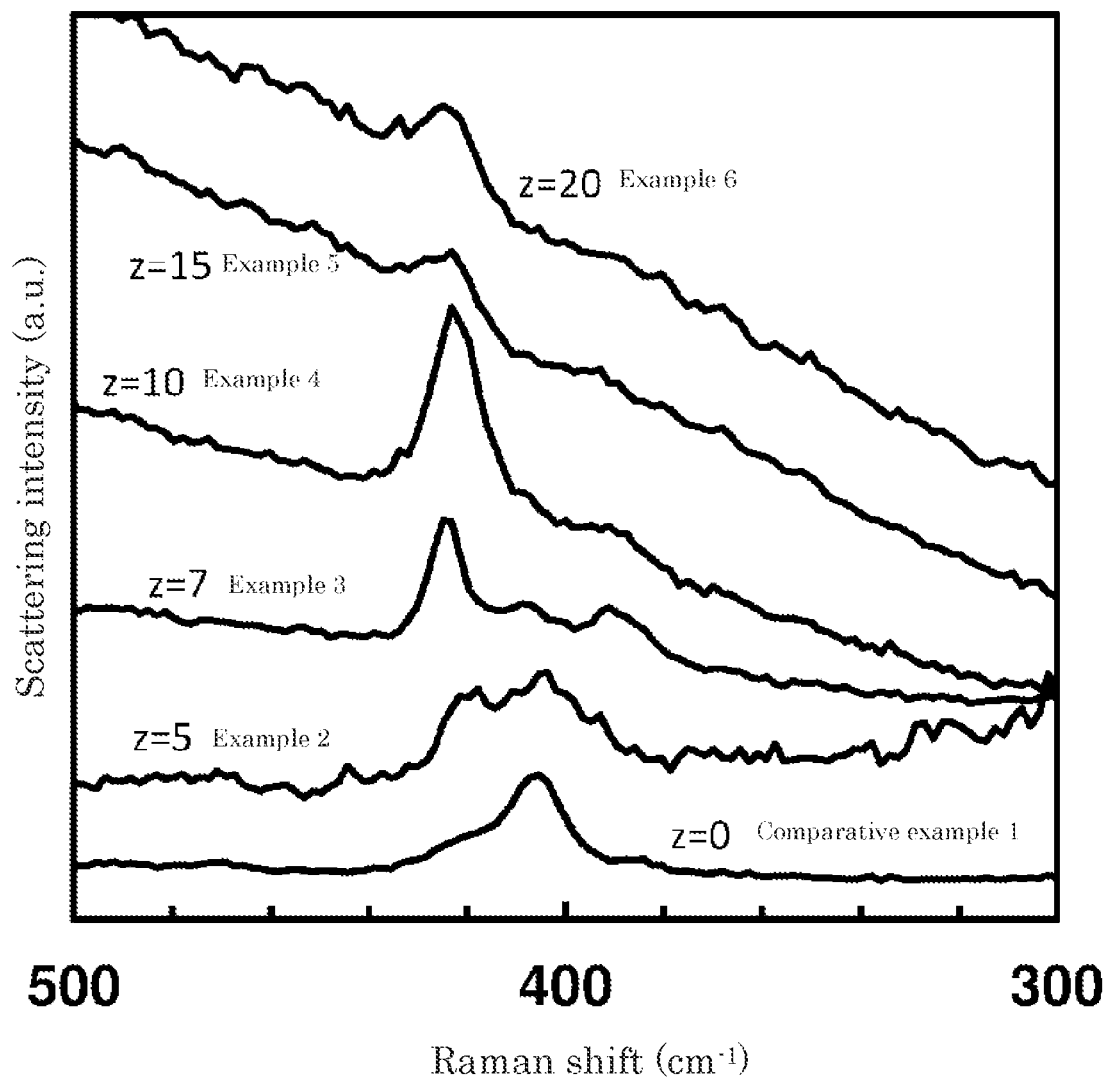
FIG. 3 is Raman spectra of sulfide solid electrolytes according to examples and a comparative example.

FIG. 3 shows the Raman spectra of Examples 2 to 6 and Comparative Example 1. Table 1 shows the molecular structures identified from the Raman spectra of Examples 1 to 23, Comparative Example 1, and Reference Example 2.

(3) Ion Conductivity (σ)

For the ion conductivity (σ), the ion conductivity at 25° C. was determined by measuring the alternating-current impedance with the use of "VMP-300" from (Bio-Logic) in accordance with the method described above.

It is to be noted that for Examples 24 to 26, Comparative Examples 2 and 3, and Reference Examples 3 and 4, the ion conductivity was also measured at each temperature of −30° C., −20° C., −10° C., 0° C., and 50° C., and the activation energy was calculated by the Arrhenius equation.

Figure 4:
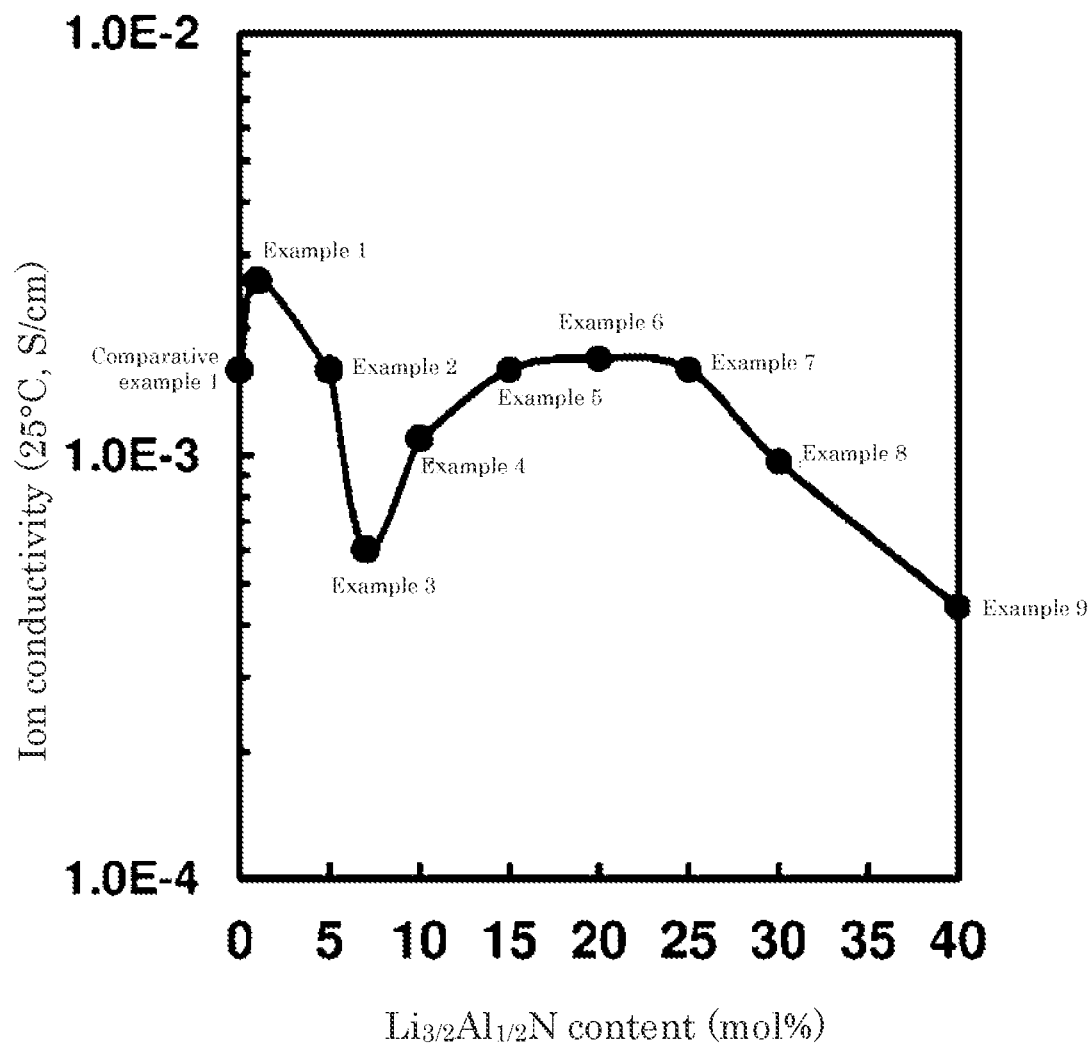
FIG. 4 is a graph showing the ionic conductivity of sulfide solid electrolytes according to examples and a comparative example at 25° C.

FIG. 4 shows the ion conductivity at 25° C. for Examples 1 to 9 and Comparative Example 1, and Table 1 shows the ion conductivity at 25° C. for Examples 1 to 23, Comparative Example 1, and Reference Example 2.

Table 2 shows the ionic conductivity at 25° C. and the activation energy for Examples 24 to 26, Comparative Examples 2 and 3, and Reference Examples 3 and 4.

(4) First Coulombic Efficiency and Charge-Discharge Performance (4-1) Preparation of Positive Active Material A $LiNbO_3$ precursor solution was prepared by dissolving a metal Li in an ultra-dehydrated ethanol and then dissolving niobium ethoxide ($Nb(OC_2H_5)_5$) therein. The particle surfaces of $LiNi_{0.8}Co_{0.15}Al_{0.05}O_2$ (NCA) were coated with the $LiNbO_3$ precursor with the use of a rolling flow coating device (FD-MP-01F) from Powrex Corporation. The NCA coated with the $LiNbO_3$ precursor was subjected to a heat treatment at 350° C. for 1 hour to prepare a $LiNbO_3$-coated NCA. This $LiNbO_3$-coated NCA was used as the positive active material.

(4-2) Preparation of all-Solid-State Battery Cell (Li-NCA Half-Cell) The $LiNbO_3$-coated NCA and the sulfide solid electrolyte ($Li_3PS_4$) according to Reference Example 1 were weighed so as to be $LiNbO_3$-coated NCA:$Li_3PS_4$=70:30 (% by mass), and then mixed in an agate mortar. The sulfide solid electrolyte according to Example 1 was put into a powder molder with an inner diameter of 10 mm, and then subjected to pressure molding with the use of a hydraulic press. After releasing the pressure, the NCA-$Li_3PS_4$ mixed powder was put on one side of the solid electrolyte layer according to Example 1 and subjected to pressure molding at 360 MPa per sample area for 5 minutes. After releasing the pressure, metal Li foil was attached to the opposite surface of the sulfide solid electrolyte layer according to Example 1 and subjected to pressure molding to obtain a layered product of the positive composite layer, the sulfide solid electrolyte layer according to Example 1, and the metal Li foil. This layered product was encapsulated in an aluminum laminate cell under reduced pressure, and pressed with a stainless steel plate to obtain an all-solid-state battery cell (Li-NCA half-cell).

All-solid-state battery cells (Li-NCA half-cells) including the sulfide solid electrolytes according to Examples 2 and 4 and Comparative Example 1 were obtained by the same operations as in Example 1, except that the sulfide solid electrolyte according to Example 1 was changed to the sulfide solid electrolytes according to Examples 2 and 4 and Comparative Example 1.

(4-3) Charge-Discharge Test

The all-solid-state battery cells (Li-NCA half-cells) mentioned above were subjected to a charge-discharge test under the following conditions. The charge-discharge test was performed in a constant-temperature bath at 50° C. The charge was constant-current constant-voltage (CCCV) charge at a charge current of 0.125 mA/cm$^2$ with a charge upper limit voltage of 4.35 V. The charge cutoff condition was set to allow the charge until the charge current reached 0.0625 mA/cm$^2$. The discharge was constant current (CC) discharge at a discharge current of 0.125 mA/cm$^2$ with an end-of-discharge voltage of 2.85 V. The pause time between the charge and the discharge was set to be 30 minutes. The percentage of the first discharge capacity with respect to the first amount of charge in this case was determined as a "first coulombic efficiency (%)".

Figure 5:
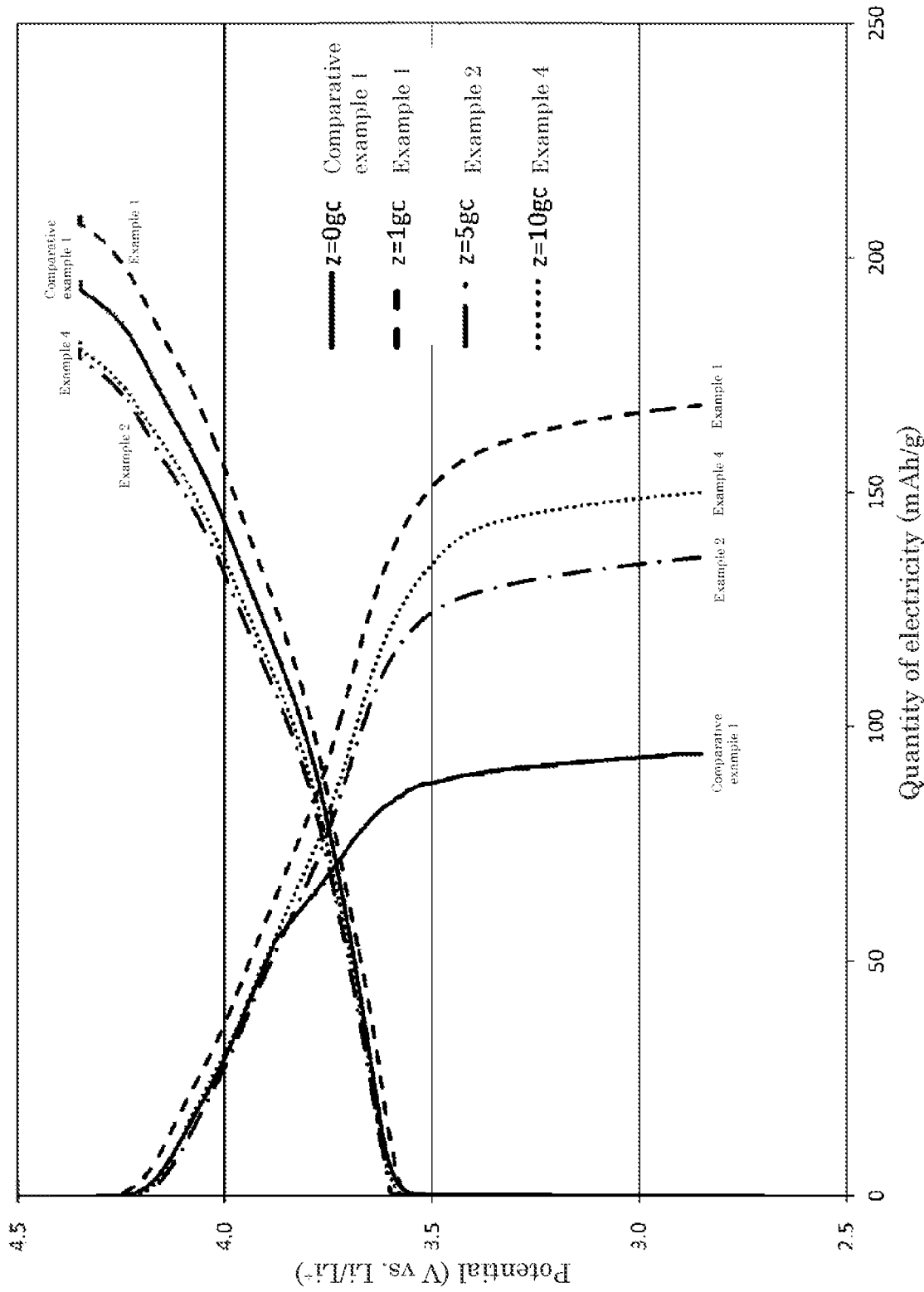
FIG. 5 is a graph showing the initial charge-discharge performance of all-solid-state batteries according to examples and a comparative example.

FIG. 5 shows the first charge-discharge performance of Example 1, Example 2, Example 4, and Comparative Example 1. Table 1 shows the first coulombic efficiencies (%) of Example 1, Example 2, Example 4, and Comparative Example 1.

(5) Reduction Resistance of Sulfide Solid Electrolyte (5-1) Evaluation Test with Cell for Reduction Resistance Evaluation In a glove box in an argon atmosphere with a dew point of −50° C. or lower, the sulfide solid electrolyte according to Example 1 and a SUS316L powder were weighed so as to be 1:4 in ratio by mass, and then mixed in an agate mortar. The sulfide solid electrolyte ($Li_3PS_4$) according to Reference Example 1 was put into a powder molder with an inner diameter of 10 mm, and then subjected to pressure molding with the use of a hydraulic press. After releasing the pressure, a mixed powder of the SUS316 powder mentioned above and the sulfide solid electrolyte powder according to Example 1 was put on one side of the $Li_3PS_4$ layer and subjected to pressure molding at 360 MPa for 5 minutes. After releasing the pressure, metal Li foil was attached to the opposite surface of the $Li_3PS_4$ layer and subjected to pressure molding to obtain a layered product of the mixture layer of the sulfide solid electrolyte according to Example 1, the $Li_3PS_4$ layer, and metal Li foil.

This layered product was encapsulated in an aluminum laminate cell under reduced pressure, and pressed with a stainless steel plate to obtain a cell for reduction resistance evaluation with the mixture layer of the sulfide solid electrolyte according to Example 1 as a working electrode and the metal Li foil as a counter electrode.

The charge test conditions were a measurement temperature of 50° C., and constant-current constant-voltage (CCCV) charge for the charge, with a charge current of 0.1 mA/cm$^2$, a charge lower limit potential of 0.01 V, and a total charge time of 100 hours. In this regard, the reaction of reducing the mixture layer of the sulfide solid electrolyte according to Example 1 is referred to as "charge". The amount of charge after 20 hours from the start of the charge was defined as the reductive decomposition capacity (mAh/g) of the sulfide solid electrolyte after 20 hours. Since the SUS316L powder is stable at a potential of 0 V vs. Li/Li$^+$, the redox species is only the sulfide solid electrolyte. Thus, the amount of electricity flowing through the cell for evaluation means the amount of reductive decomposition of the sulfide solid electrolyte.

The sulfide solid electrolytes according to Examples 2, 4, 8 to 17, 19, 20, and 22 and Comparative Example 1 were evaluated for reduction resistance in accordance with the same procedure.

Table 1 shows the reductive decomposition capacities of the sulfide solid electrolytes according to Examples 1, 2, 4, 8 to 17, 19, 20, and 22 and Comparative Example 1 after 20 hours from the start of the charge.

(5-2) Evaluation Test with all-Solid-State Battery Cell (Li-Gr Half-Cell)

The sulfide solid electrolytes according to Examples 24 to 26, Comparative Examples 2 and 3, and Reference Examples 3 and 4 were evaluated for reduction resistance in accordance with the following procedure.

Graphite particles (Gr) and the sulfide solid electrolyte ($Li_{10.21}GeP_2Al_{0.07}S_{12}N_{0.14}$) according to Example 24 were weighed so as to be Gr:$Li_{10.21}GeP_2Al_{0.07}S_{12}N_{0.14}$=60:40 (% by mass), and then mixed in an agate mortar. $Li_3PS_4$ was put into a powder molder with an inner diameter of 10 mm, and then subjected to pressure molding with the use of a hydraulic press. After releasing the pressure, the Gr-$Li_{10.21}GeP_2Al_{0.07}S_{12}N_{0.14}$ mixed powder was put on one side of the $Li_3PS_4$ layer and subjected to pressure molding. After releasing the pressure, metal Li foil was attached to the opposite surface of the $Li_3PS_4$ layer and subjected to pressure molding to obtain a layered product of the mixture layer of the sulfide solid electrolyte according to Example 24, the Li₃PS₄ solid electrolyte layer, and metal Li foil. This layered product was encapsulated in an aluminum laminate cell under reduced pressure, and pressed with a stainless steel plate to obtain an all-solid-state battery cell (Li-Gr half-cell) with the mixture layer of the sulfide solid electrolyte according to Example 24 as a working electrode and the metal Li foil as a counter electrode.

All-solid-state battery cells (Li-Gr half-cells) including the sulfide solid electrolytes according to Examples 25 and 26 and Comparative Example 3 were obtained by the same operations as in Example 24, except that the sulfide solid electrolyte according to Example 24 was changed to the sulfide solid electrolytes according to Examples 25 and 26 and Comparative Example 3.

The all-solid-state battery cells (Li-Gr half-cells) mentioned above were subjected to a discharge test (lithiation of Gr) under the following conditions. The discharge test was performed in a constant-temperature bath at 50° C. The discharge was constant current (CC) discharge with a discharge current of 0.125 mA/cm². The discharge capacity Q in this case was plotted on a graph (dQ/dV curve) that shows the relation between the differential value dQ/dV differentiated with respect to the voltage V and the voltage V.

Figure 9:
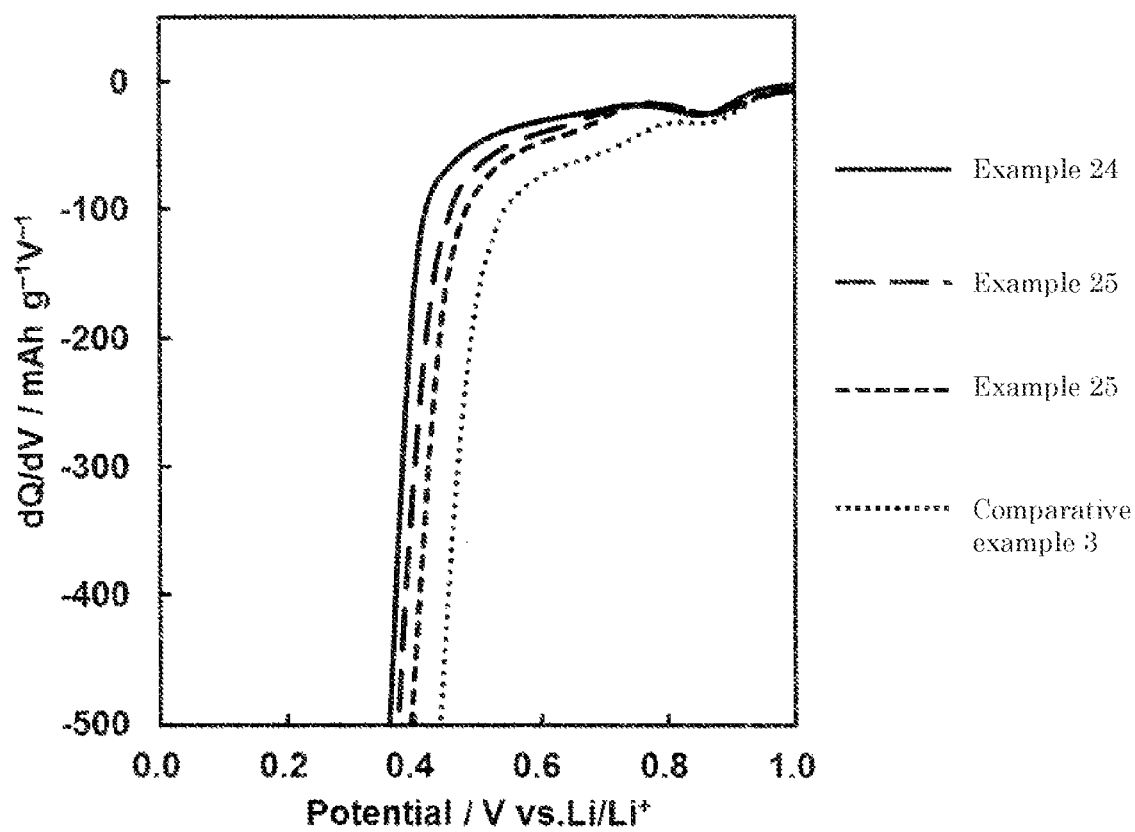
FIG. 9 is dQ/dV curves of all-solid-state batteries according to examples and a comparative example.

FIG. 9 shows the dQ/dV curves of Examples 24 to 26 and Comparative Example 3. Table 2 shows the values of the voltage V at $dQ/dV=-100$ mAhg$^{-1}$V$^{-1}$ for Examples 24 to 26 and Comparative Example 3. It is to be noted that the large amount of change in dQ/dV around 0.4 V is confirmed from FIG. 9. Since the lithiation potential of Gr is about 0.1 V vs Li/Li⁺, the change in dQ/dV around 0.4V is presumed to be derived from the reductive decomposition of the sulfide solid electrolyte. Accordingly, the fact that the value of the voltage V at $dQ/dV=-100$ mAhg$^{-1}$V$^{-1}$ for the all-solid-state battery cell (Li-Gr half-cell) according to the present example is shifted in the electronegative direction means that the reductive decomposition potential of the sulfide solid electrolyte is shifted in the electronegative direction, that is, the reduction resistance improved.

(6) Evaluation of Atmospheric Stability

The amount of hydrogen sulfide generated was measured in order to evaluate the chemical stability of the sulfide solid electrolyte in the atmosphere. In a glove box in an argon atmosphere with a dew point of −50° C. or lower, 100 mg of the sulfide solid electrolyte powder according to each of the examples and comparative examples was subjected to uniaxial pressing at 360 MPa per sample area for 5 minutes with the use of a powder molder with an inner diameter of 10 mm, thereby providing pellets. Thereafter, the obtained pellets were placed inside a hermetically sealed desiccator (actual volume: 2100 cm³, temperature: 20° C., relative humidity: about 90%), and the amount of hydrogen sulfide generated was measured with the use of a hydrogen sulfide sensor (TPA-5200E). The measurement was terminated after reaching the detection upper limit 50 ppm of the hydrogen sulfide sensor or after a lapse of 40 minutes for the measurement time.

The amount V (cm³/g) of hydrogen sulfide generated from the solid electrolyte per gram was determined from the following formula with the obtained concentration C (ppm), the real volume L (cm³) of the desiccator, and the mass m (g) of the pellet.

$$V(\text{cm}^3/\text{g}) = C \times L \times 10^{-6}/m$$

Figure 6:
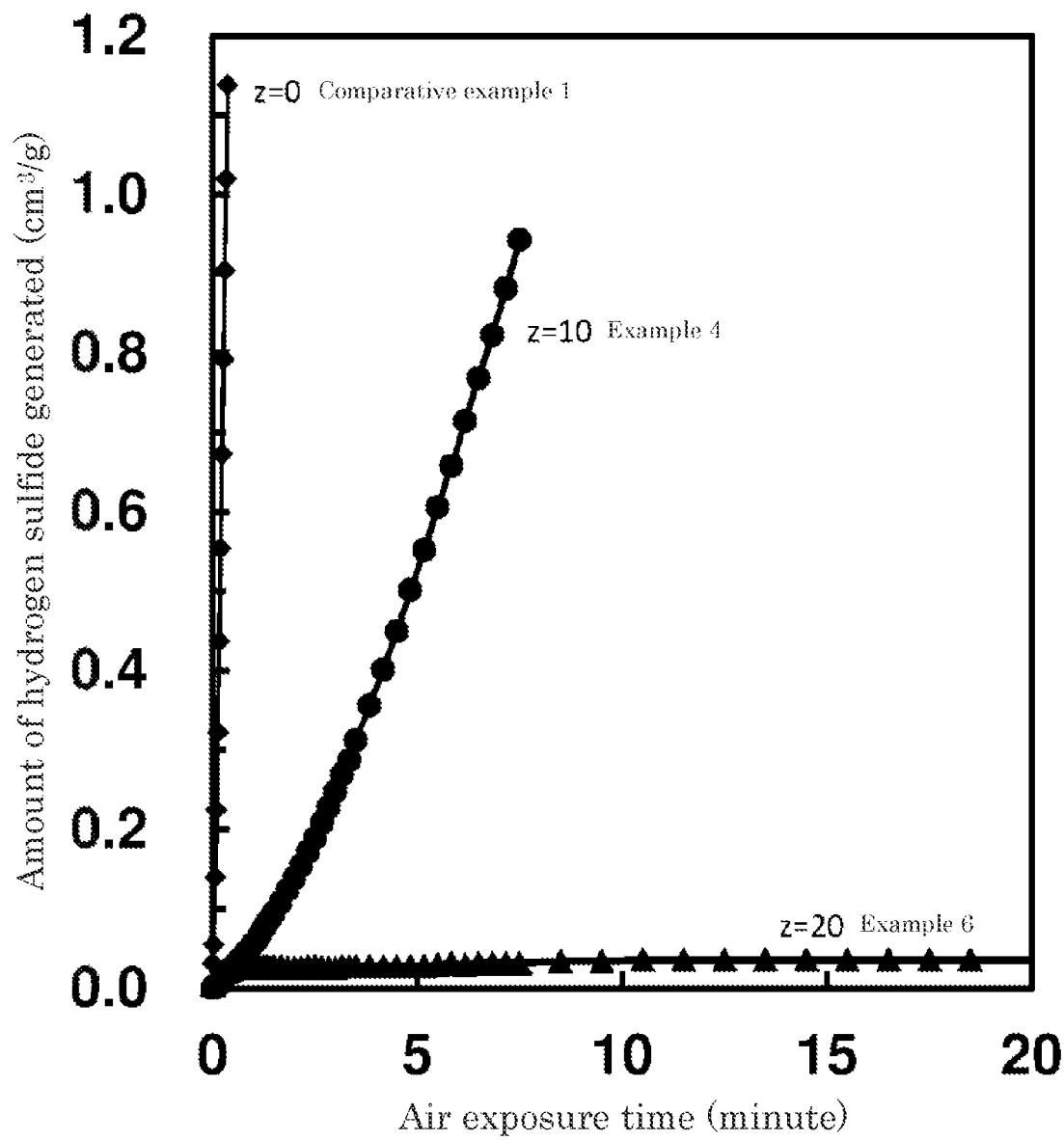
FIG. 6 is a graph showing the amounts of hydrogen sulfide generated from sulfide solid electrolytes according to examples and a comparative example.
Figure 7:
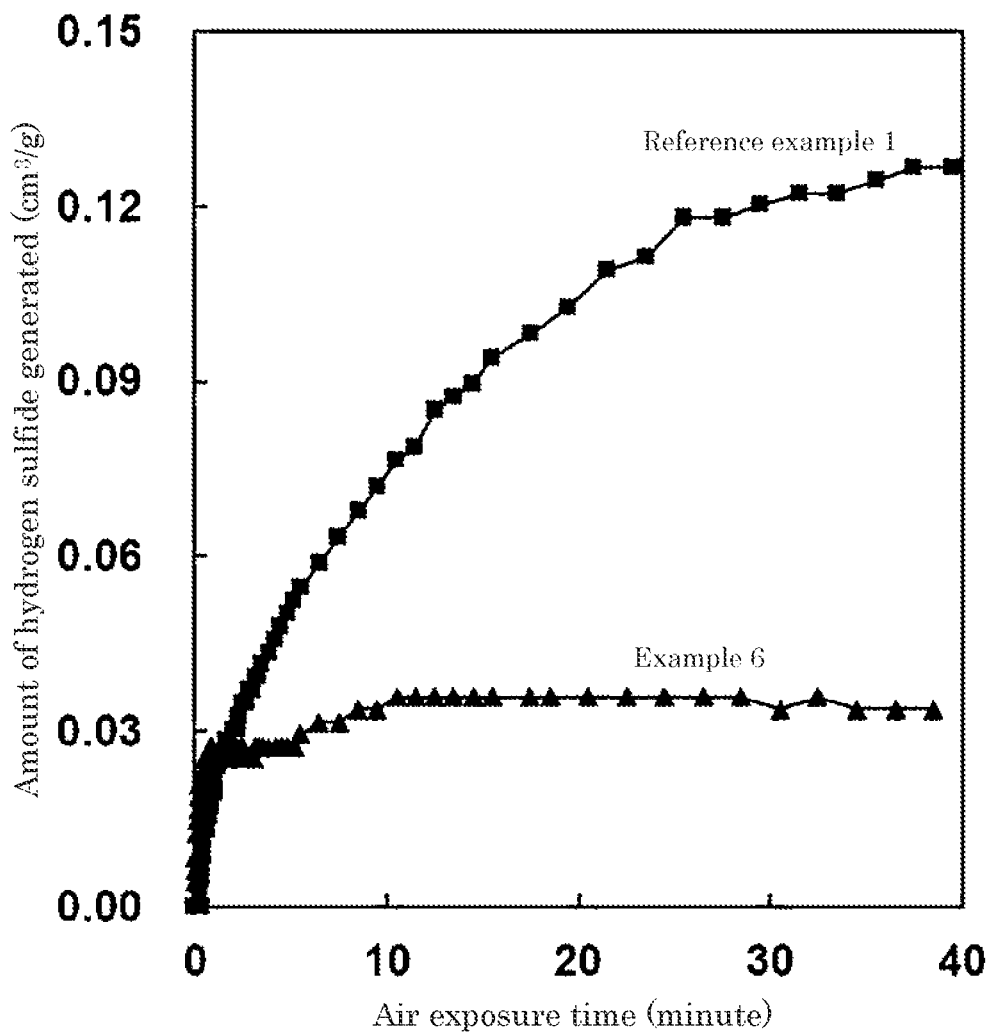
FIG. 7 is a graph showing the amounts of hydrogen sulfide generated from sulfide solid electrolytes according to an example and a reference example.

FIGS. 6 and 7 are graphs showing the relation between the air exposure time (minutes) and the amount of hydrogen sulfide generated (cm³/g) for the sulfide solid electrolyte pellets according to the examples and comparative examples mentioned above.

FIG. 6 shows the amount of hydrogen sulfide generated for the air exposure time up to 20 minutes in Example 4, Example 6, and Comparative Example 1, and FIG. 7 shows the amount of hydrogen sulfide generated for the air exposure time up to 40 minutes in Example 6 and Reference Example 1.

| | α, β, and Element M in $zLi_\alpha M_\beta N$ of General Formula | | | y in $yLi_2S$ and z in $zLi_\alpha M_\beta N$ of General Formula (mol %) | | Content Ratio to Phosphorus (mole ratio) | | |
|---|---|---|---|---|---|---|---|---|
| | M | α | β | z | y | Lithium | Element M | Nitrogen |
| Example 1 | Al | 1.5 | 0.5 | 1 | 0.70 | 2.36 | 0.01 | 0.02 |
| Example 2 | Al | 1.5 | 0.5 | 5 | 0.70 | 2.46 | 0.04 | 0.09 |
| Example 3 | Al | 1.5 | 0.5 | 7 | 0.70 | 2.52 | 0.06 | 0.13 |
| Example 4 | Al | 1.5 | 0.5 | 10 | 0.70 | 2.61 | 0.09 | 0.19 |
| Example 5 | Al | 1.5 | 0.5 | 15 | 0.70 | 2.77 | 0.15 | 0.29 |
| Example 6 | Al | 1.5 | 0.5 | 20 | 0.70 | 2.96 | 0.21 | 0.42 |
| Example 7 | Al | 1.5 | 0.5 | 25 | 0.70 | 3.17 | 0.28 | 0.56 |
| Example 8 | Al | 1.5 | 0.5 | 39 | 0.70 | 3.40 | 0.36 | 0.71 |
| Example 9 | Al | 1.5 | 0.5 | 40 | 0.70 | 4.00 | 0.56 | 1.11 |
| Example 10 | Al | 1.5 | 0.5 | 10 | 0.75 | 3.33 | 0.11 | 0.22 |
| Example 11 | Al | 1.5 | 0.5 | 30 | 0.50 | 1.64 | 0.21 | 0.43 |
| Example 12 | Al | 1.5 | 0.5 | 20 | 0.67 | 2.60 | 0.19 | 0.38 |
| Example 13 | Al | 1.5 | 0.5 | 25 | 0.07 | 2.79 | 0.25 | 0.51 |
| Example 14 | Al | 1.5 | 0.5 | 30 | 0.67 | 3.00 | 0.32 | 0.65 |
| Example 15 | B | 1.5 | 0.5 | 1 | 0.70 | 2.36 | 0.01 | 0.02 |
| Example 16 | B | 1.5 | 0.5 | 10 | 0.70 | 2.61 | 0.09 | 0.19 |
| Example 17 | B | 1.5 | 0.5 | 20 | 0.70 | 2.96 | 0.21 | 0.42 |
| Example 18 | B | 1.5 | 0.5 | 30 | 0.70 | 3.40 | 0.36 | 0.71 |
| Example 19 | Si | 1.67 | 0.33 | 1.5 | 0.70 | 2.38 | 0.01 | 0.03 |
| Example 20 | Si | 1.67 | 0.33 | 15 | 0.70 | 2.80 | 0.09 | 0.28 |
| Example 21 | Si | 1.67 | 0.33 | 20 | 0.70 | 3.03 | 0.14 | 0.42 |
| Example 22 | Si | 1.67 | 0.33 | 30 | 0.70 | 3.38 | 0.21 | 0.63 |
| Example 23 | Si | 1.67 | 0.33 | 45 | 0.70 | 4.12 | 0.36 | 1.07 |
| Comparative | — | — | — | 0 | 0.70 | 2.33 | 0.00 | 0.00 |

-continued

| | | | | | | | |
|---|---|---|---|---|---|---|---|
| Example 1 Reference Example 2 | — | 3 | — | 20 | 0.70 | 3.58 | — | 0.42 |

| | Crystalline Structure derived from XRD Spectrum | Molecular Structure derived from Raman Spectrum | Ion Conductivity $\sigma$ (25° C.) (S/cm) | First Coulombic Efficiency (%) | Reductive Decomposition Capacity of Sulfide based Solid Electrolyte after 20 hours (mAh/g) |
|---|---|---|---|---|---|
| Example 1 | $Li_7P_3S_{11}$ | — | $2.6 \times 10^{-3}$ | 81 | 32 |
| Example 2 | $Li_7P_3S_{11}$ | $PS_4^{3-} + P_2S_7^{4-} + P_2S_6^{4-}$ | $1.6 \times 10^{-3}$ | 75 | 34 |
| Example 3 | $\beta\text{-}Li_3PS_4$ | $PS_4^{3-} + P_2S_7^{4-} + P_2S_6^{4-}$ | $0.6 \times 10^{-3}$ | — | — |
| Example 4 | Specific Crystalline Structure A | $PS_4^{3-} + P_2S_7^{4-} + P_2S_6^{4-}$ | $1.1 \times 10^{-3}$ | 82 | 30 |
| Example 5 | Specific Crystalline Structure A | $PS_4^{3-}$ | $1.6 \times 10^{-3}$ | — | — |
| Example 6 | Specific Crystalline Structure A | $PS_4^{3-}$ | $1.7 \times 10^{-3}$ | — | — |
| Example 7 | Specific Crystalline Structure A + $Li_3AlN_2$ | — | $1.6 \times 10^{-3}$ | — | — |
| Example 8 | Specific Crystalline Structure A + $Li_3AlN_2$ | — | $1.0 \times 10^{-3}$ | — | 28 |
| Example 9 | Specific Crystalline Structure A | — | $0.4 \times 10^{-3}$ | — | 23 |
| Example 10 | Specific Crystalline Structure B + $Li_2S$ | — | $1.8 \times 10^{-3}$ | — | 15 |
| Example 11 | $Li_4P_2S_6$ | — | $2.9 \times 10^{-3}$ | — | 1 |
| Example 12 | Specific Crystalline Structure A | — | $1.1 \times 10^{-3}$ | — | 28 |
| Example 13 | Specific Crystalline Structure A | — | $1.2 \times 10^{-3}$ | — | 29 |
| Example 14 | Specific Crystalline Structure B | — | $1.1 \times 10^{-3}$ | — | 28 |
| Example 15 | $Li_7P_3S_{11}$ | — | $1.4 \times 10^{-3}$ | — | 23 |
| Example 16 | $Li_7P_3S_{11}$ + Specific Crystalline Structure A | $PS_4^{3-} + P_2S_7^{4-}$ | $1.0 \times 10^{-3}$ | — | 25 |
| Example 17 | Specific Crystalline Structure A | $PS_4^{3-}$ | $1.5 \times 10^{-3}$ | — | 40 |
| Example 18 | Specific Crystalline Structure A + $Li_2S$ | $PS_4^{3-}$ | $0.8 \times 10^{-3}$ | — | — |
| Example 19 | $Li_7P_3S_{11}$ | $PS_4^{3-} + P_2S_7^{4-} + P_2S_6^{4-}$ | $2.0 \times 10^{-3}$ | — | 16 |
| Example 20 | Specific Crystalline Structure A | — | $1.1 \times 10^{-3}$ | — | 26 |
| Example 21 | Specific Crystalline Structure A | — | $1.8 \times 10^{-3}$ | — | — |
| Example 22 | Specific Crystalline Structure A | — | $1.4 \times 10^{-3}$ | — | 41 |
| Example 23 | Specific Crystalline Structure A + $Li_2S$ | — | $0.4 \times 10^{-3}$ | — | — |
| Comparative Example 1 | $Li_7P_3S_{11}$ | $PS_4^{3-} + P_2S_7^{4-}$ | $1.6 \times 10^{-3}$ | 48 | 57 |
| Reference Example 2 | $Li_2S$ | — | $0.4 \times 10^{-3}$ | — | — |

As shown in Table 1, the sulfide solid electrolytes according to the examples that contain any element of Al, B, or Si as the element M and N and have a crystalline structure are, as compared with the sulfide solid electrolyte according to Comparative Example 1, reduced in the reductive decomposition capacity after 20 hours from the start of the charge, and excellent in first coulombic efficiency. The sulfide solid electrolytes according to Example 1, Example 2, Example 4 to Example 8, Example 10, Example 12 to Example 17, and Example 19 to 22 are favorable in ion conductivity at 25° C.

In contrast, the sulfide solid electrolyte according to Comparative Example 1 containing no elements M and N is favorable in ion conductivity, but high in the reductive decomposition capacity after 20 hours from the start of the charge and inferior in first coulombic efficiency.

From Table 1, because a sulfide solid electrolyte that has a structure expected to show an ion conductivity of $10^{-3}$ Scm$^{-1}$ or more and favorable atmospheric stability is obtained with the content ratio of Li to P being 2.77 or more and 3.38 or less in terms of mole ratio and the content ratio of N to P being 0.28 or more and 0.65 or less in terms of mole ratio, it has been confirmed that it is particularly preferable for the composition of the sulfide solid electrolyte to have such values.

In addition, in the case where the sulfide solid electrolyte contains Al as the element M, there is no precipitation of $Li_2S$ even in the case of the high content ratios of the Li element and N, such as the content ratio of Li to P being 3.40 in terms of mole ratio and the content ratio of N to P being 0.71 in terms of mole ratio. From the foregoing, it has been suggested that it is particularly preferable to include Al as the element M.

As shown in FIG. 2, it has been confirmed that the sulfide solid electrolytes according to all of the examples and comparative examples have peaks observed in the XRD spectra, and have crystalline structures. Example 1 and Example 2 have a crystalline structure of $Li_7P_3S_{11}$, Example 3 has a crystalline structure of ß-$Li_3PS_4$, and Example 11 has a crystalline structure of $Li_4P_2S_6$. The crystalline structure of the sulfide solid electrolytes according to Examples 4 to 9 is a specific crystalline structure A that has diffraction peaks at $2\theta=17.9°$, 19.1°, 29.1°, 29.8°, and 30.9°. It has been confirmed that the crystalline structure of the sulfide solid electrolyte according to Example 10 is a specific crystalline structure B that has diffraction peaks at $2\theta=17.9°$, 19.1°, 29.1°, and 29.8°.

As shown by the Raman spectrum of FIG. 3, the sulfide solid electrolytes according to the examples undergo a decrease in peak derived from the crosslinked sulfur $P_2S_7^{4-}$ around a Raman shift of 406 cm$^{-1}$ with increased z, that is, with the increased content of nitrogen (N), causing a peak derived from $PS_4^{3-}$ around a Raman shift of 423 cm$^{-1}$ to appear. Thus, the molecular structures based on the Raman spectra of Examples 1 and 15 in Table 1 are presumed to be composed of $PS_4^{3-}$, $P_2S_7^{4-}$, and $P_2S_6^{1-}$. The molecular structures based on the Raman spectra of Examples 7 to 9, Examples 11 to 14, and Examples 20 to 22 are presumed to be composed of $PS_4^{3-}$.

As shown in FIGS. 6 and 7, it has been successfully confirmed that the amounts of hydrogen sulfide generated in Examples 4 and 6 are smaller than the amount of hydrogen sulfide generated in Comparative Example 1. In particular, Example 6 with z=20 is superior in the effect of inhibiting the hydrogen sulfide generation as compared with Comparative Example 1 and Reference Example 1. Accordingly, it has been suggested that the sulfide solid electrolyte not only has high reduction resistance but also excellent atmospheric stability.

The reason why the sulfide-based solid electrolyte has a highly inhibitory effect on the generation of hydrogen sulfide is presumed as follows. As shown by the Raman spectrum of FIG. 3, the sulfide solid electrolytes according to the examples undergo a decrease in peak derived from the crosslinked sulfur $P_2S_7^{4-}$ around a Raman shift of 406 cm$^{-1}$ with increased z, that is, with the increased content of N. In addition, the sulfide solid electrolytes according to the examples have no appearing peak derived from $Li_2S$ in the XRD (X-ray diffraction) spectra shown in FIG. 2. From these facts, the sulfide solid electrolyte with the content of N increased is presumed to reduce so-called cross-linked sulfur $P_2S_7^{4-}$($S_3P$—S—$PS_3$), which is unstable in the atmosphere, substantially without containing $Li_2S$, which is likely to react with water, thus making it possible to improve the inhibitory effect on the generation of hydrogen sulfide.

Further, the reason why Example 6 (z=20) has a smaller amount of hydrogen sulfide generated than Reference Example 1 without cross-linked sulfur $P_2S_7^{4-}$ is believed to be because the introduction of N into the structure of the solid electrolyte constituted a three-dimensional network, thereby making the bonds stronger. It is generally known that the water resistance is improved by introducing N in oxynitride glass with O of oxide glass partially replaced with N.

The comparison among Example 6, Example 17, Example 21, and Reference Example 2 with the content of N fixed with z=20 and y=0.70 finds the precipitation of $Li_2S$ only in Reference Example 2 containing no element M. From the foregoing, the precipitation of $Li_2S$ is considered allowed to be inhibited by containing the element M.

The reason why the precipitation of $Li_2S$ can be inhibited by containing the element M in the sulfide solid electrolyte is considered as follows. In the case of using $Li_3N$ as a starting material for the sulfide-based solid electrolyte containing N, $Li_3N$ and $P_2S_5$ react dramatically to release $N_2$, thereby resulting in precipitation of $Li_2S$. This is believed to be because of the low N defect generation energy of $Li_3N$. In contrast, according to the invention of the present application, because the N defect generation energy of $Li_\alpha M_\beta N$ is higher than the N defect generation energy of $Li_3N$, the reaction is considered to proceed slowly in the process of synthesizing the sulfide-based solid electrolyte, thereby inhibiting the release of $N_2$ and the precipitation of $Li_2S$.

It is to be noted that the "defect generation energy" herein refers to a value calculated with the use of the total energy $E_{perfect}$ of a crystalline structure including no defects, the total energy $E_{vacancy}$ of a crystalline structure including defects, and the chemical potential μ of a defective atom, and means a parameter defined by the following formula.

$$E_{defect}=(E_{vacancy}+\mu)-E_{perfect}$$

| | Composition of Sulfide-based Solid Electrolyte | z in $zLi_\alpha M_\beta N$ of General Formula (mol %) z | Content Ratio to Phosphorus (mole ratio) | | | Crystalline Structure derived from XRD Spectrum | Ion Conductivity σ (25° C.) (S/cm) | Activation Energy (kJmol$^{-1}$) | Working Electrode Potential of Li-Gr Half Cell at dQ/dV = 100 mAhg$^{-1}$V$^{-1}$ (V) |
|---|---|---|---|---|---|---|---|---|---|
| | | | Lithium | Element M | Nitrogen | | | | |
| Example 24 | $Li_{10.21}GeP_2Al_{0.07}S_{12}N_{0.14}$ | 12.4 | 5.11 | 0.04 | 0.07 | $Li_{10}GeP_2S_{12}$ | 7.4 × 10$^{-3}$ | 26 | 0.42 |
| Example 25 | $Li_{10.65}GeP_2Al_{0.22}S_{12}N_{0.43}$ | 30.2 | 5.33 | 0.11 | 0.22 | $Li_{10}GeP_2S_{12}$ | 6.4 × 10$^{-3}$ | 26 | 0.46 |
| Example 26 | $Li_{11.11}GeP_2Al_{0.37}S_{12}N_{0.74}$ | 42.5 | 5.56 | 0.19 | 0.37 | $Li_{10}GeP_2S_{12}$ | 4.3 × 10$^{-3}$ | 27 | 0.49 |
| Comparative Example 2 | $Li_{12.33}GeP_2Al_{0.78}S_{12}N_{1.56}$ | 60.9 | 6.15 | 0.40 | 0.80 | Unknown | 0.17 × 10$^{-3}$ | 37 | — |
| Comparative Example 3 | $Li_{10}GeP_2S_{12}$ | — | — | — | — | $Li_{10}GeP_2S_{12}$ | 5.6 × 10$^{-3}$ | 26 | 0.55 |
| Reference Example 3 | $Li_{10}Ge_{0.93}P_2Al_{0.07}S_{11.97}$ | — | — | — | — | $Li_{10}GeP_2S_{12}$ | 6.1 × 10$^{-3}$ | 27 | — |
| Reference Example 4 | $Li_{10}GeP_2S_{11.86}O_{0.14}$ | — | — | — | — | $Li_{10}GeP_2S_{12}$ | 4.7 × 10$^{-3}$ | 27 | — |

As is clear from Table 2, the sulfur-based sulfide solid electrolytes that contain Li, P, S, Ge, Al, and N and have a crystalline structure are excellent ion conductivity at 25° C.

In addition, the fact that the value of the voltage V at dQ/dV=−100 mAhg$^{-1}$V$^{-1}$ is shifted in the electronegative direction means that the reductive decomposition potential of the sulfide solid electrolyte is shifted in the electronegative direction, that is, the reduction resistance improved, and the sulfide solid electrolytes according to the examples are also excellent in reduction resistance.

Among the electrolytes, the sulfide solid electrolyte according to Example 24 has been found to show an excellent superior ion conductivity at 25° C. as compared with the sulfide solid electrolytes according to Reference Examples 3 and 4.

From the foregoing results, it has been demonstrated that the sulfide solid electrolyte according to the present invention, with high reduction resistance, is capable of improving the first coulombic efficiency of the all-solid-state battery including the sulfide solid electrolyte. In addition, it has also been demonstrated that the sulfide solid electrolyte according to the present invention is also capable of improving the atmospheric stability.

INDUSTRIAL APPLICABILITY

The all-solid-state battery including the sulfide solid electrolyte according to the present invention is excellent in first coulombic efficiency, and thus suitably used as, for example, a lithium-ion all-solid-state battery for HEVs.

DESCRIPTION OF REFERENCE SIGNS

1: Negative electrode layer
2: Positive electrode layer
3: Solid electrolyte layer
4: Negative electrode substrate layer
5: Negative composite layer
6: Positive composite layer
7: Positive electrode substrate layer
10: all-solid-state battery

The invention claimed is:

1. A sulfide solid electrolyte comprising N and at least one element M selected from the group consisting of Al, Si, B, Mg, Zr, Ti, Hf, Ca, Sr, Sc, Ce, Ta, Nb, W, Mo, and V, and having a crystalline structure,
wherein an ion conductivity at 25° C. is $0.4 \times 10^{-3}$ S/cm or more, and
wherein the sulfide solid electrolyte has a composition represented by a general formula (100-z) (y$Li_2$S·(1-y)$P_2S_5$)·z$Li_\alpha M_\beta$N where 0<z≤40, 0.50≤y≤0.75, α and ß represent numerical values that provide stoichiometric ratios depending on a type of the element M.

2. A sulfide solid electrolyte according to claim 1, wherein the at least one element M includes Al.

3. A sulfide solid electrolyte comprising Li, P, S, N and at least one element M selected from the group consisting of Al, Si, and B, and having a crystalline structure,
wherein the crystalline structure includes a crystalline structure that has a crystal phase of $Li_7P_3S_{11}$, $Li_4P_2S_6$, or ß-$Li_3PS_4$, or a first crystalline structure that has diffraction peaks at 2θ=17.9°±0.5°, 19.1°±0.5°, 29.1°±0.5°, and 29.8°±0.5° in X-ray diffraction measurement with a CuKα line,
wherein a content ratio of the N to the P is 0.02 or more in terms of mole ratio, and
wherein a content ratio of the M to the P is 0.01 or more in terms of mole ratio.

4. The sulfide solid electrolyte according to claim 3, wherein the first crystalline structure includes a specific crystalline structure A that has diffraction peaks at 2θ=17.9°+0.5°, 19.1°±0.5°, 29.1°±0.5°, 29.8°±0.5°, and 30.9°±0.5° in the X-ray diffraction measurement, or a specific crystalline structure B that has diffraction peaks at 2θ=17.9°±0.5°, 19.1°±0.5°, 29.1°±0.5°, and 29.8°±0.5° and has no diffraction peak at 30.9°±0.5° in the X-ray diffraction measurement.

5. The sulfide solid electrolyte according to claim 3,
wherein a content ratio of the Li to the P is 1.64 or more and 4.00 or less in terms of mole ratio, and the content ratio of the N to the P is 0.02 or more and 1.11 or less in terms of mole ratio.

6. The sulfide solid electrolyte according to claim 5, wherein the content ratio of the Li to the P is 2.77 or more and 3.38 or less in terms of mole ratio, and the content ratio of the N to the P is 0.28 or more and 0.65 or less in terms of mole ratio.

7. A sulfide solid electrolyte comprising N, Ge and at least one element M selected from the group consisting of Al, Si, B, Mg, Zr, Ti, Hf, Ca, Sr, Sc, Ce, Ta, Nb, W, Mo, and V, and having a crystalline structure,
wherein an ion conductivity at 25° C. is $0.4 \times 10^{-3}$ S/cm or more, and
wherein the sulfide solid electrolyte has a composition represented by a general formula (100-z) $Li_{10}GeP_2S_{12}$·z$Li_\alpha M_\beta$N where 0<z≤50, α and ß represent numerical values that provide stoichiometric ratios depending on a type of the element M.

8. The sulfide solid electrolyte according to claim 1, wherein the ion conductivity at 25° C. is $1.0 \times 10^{-3}$ S/cm or more.

9. An all-solid-state battery comprising:
a negative electrode layer;
a solid electrolyte layer; and
a positive electrode layer,
wherein the negative electrode layer, the solid electrolyte layer, the positive electrode layer, or a combination thereof contains the sulfide solid electrolyte according to claim 1.

10. A sulfide solid electrolyte comprising Li, P, S, N, Ge and at least one element M selected from the group consisting of Al, Si, and B, and having a crystalline structure,
wherein the crystalline structure includes a crystalline structure that has a crystal phase of $Li_{10}GeP_2S_{12}$,
wherein a content ratio of the N to the P is 0.02 or more in terms of mole ratio, and
wherein a content ratio of the M to the P is 0.01 or more in terms of mole ratio.

11. A sulfide solid electrolyte according to claim 3, wherein the crystalline structure includes the crystalline structure that has the crystal phase of $Li_7P_3S_{11}$.

12. A sulfide solid electrolyte according to claim 3, wherein the at least one element M includes Al.

13. An all-solid-state battery comprising:
a negative electrode layer;
a solid electrolyte layer; and
a positive electrode layer,
wherein the negative electrode layer, the solid electrolyte layer, the positive electrode layer, or a combination thereof contains the sulfide solid electrolyte according to claim 3.

14. A sulfide solid electrolyte according to claim 7, wherein the at least one element M includes Al.

15. An all-solid-state battery comprising:
a negative electrode layer;
a solid electrolyte layer; and
a positive electrode layer,
wherein the negative electrode layer, the solid electrolyte layer, the positive electrode layer, or a combination thereof contains the sulfide solid electrolyte according to claim 7.

16. A sulfide solid electrolyte according to claim 10, wherein the at least one element M includes Al.

17. The sulfide solid electrolyte according to claim 10, wherein a content ratio of the Li to the P is 1.64 or more and 4.00 or less in terms of mole ratio, and the content ratio of the N to the P is 0.02 or more and 1.11 or less in terms of mole ratio.

18. The sulfide solid electrolyte according to claim 17, wherein the content ratio of the Li to the P is 2.77 or more and 3.38 or less in terms of mole ratio, and the content ratio of the N to the P is 0.28 or more and 0.65 or less in terms of mole ratio.

19. An all-solid-state battery comprising:
a negative electrode layer;
a solid electrolyte layer; and
a positive electrode layer,
wherein the negative electrode layer, the solid electrolyte layer, the positive electrode layer, or a combination thereof contains the sulfide solid electrolyte according to claim 10.

20. The sulfide solid electrolyte according to claim 3, consisting of Li, P, S, N and at least one element M selected from the group consisting of Al, Si, and B.

21. The sulfide solid electrolyte according to claim 10, consisting of Li, P, S, N, Ge and at least one element M selected from the group consisting of Al, Si, and B.

* * * * *